US011743800B2

(12) United States Patent
Lagassey

(10) Patent No.: US 11,743,800 B2
(45) Date of Patent: Aug. 29, 2023

(54) MODULAR INTELLIGENT TRANSPORTATION SYSTEM

(71) Applicant: The Wilfred J. and Louisette G. Lagassey Irrevocable Trust, Roger J. Morgan, Trustee, Farmington, CT (US)

(72) Inventor: Paul J. Lagassey, Vero Beach, FL (US)

(73) Assignee: The Wilfred & Louisette Lagassey Irrevocable Trust, Farmington, CT (US)

( * ) Notice: Subject to any disclaimer, the term of this patent is extended or adjusted under 35 U.S.C. 154(b) by 107 days.

(21) Appl. No.: 17/229,276

(22) Filed: Apr. 13, 2021

(65) Prior Publication Data

US 2021/0235357 A1 Jul. 29, 2021

Related U.S. Application Data

(63) Continuation of application No. 15/173,165, filed on Jun. 3, 2016, now Pat. No. 10,979,959, which is a continuation of application No. 14/082,264, filed on Nov. 18, 2013, now Pat. No. 9,359,018, which is a continuation of application No. 13/185,991, filed on (Continued)

(51) Int. Cl.
| | |
|---|---|
| *H04W 40/00* | (2009.01) |
| *H04W 40/02* | (2009.01) |
| *G01S 3/80* | (2006.01) |
| *G07C 5/00* | (2006.01) |
| *G07C 5/08* | (2006.01) |
| *G08G 1/00* | (2006.01) |
| *H04L 65/61* | (2022.01) |
| *B62D 41/00* | (2006.01) |
| *G01C 21/26* | (2006.01) |

(Continued)

(52) U.S. Cl.
CPC ............ *H04W 40/02* (2013.01); *B62D 41/00* (2013.01); *G01S 3/80* (2013.01); *G07C 5/008* (2013.01); *G07C 5/0891* (2013.01); *G08G 1/205* (2013.01); *H04L 65/61* (2022.05); *G01C 21/26* (2013.01); *H04M 7/006* (2013.01); *H04W 84/12* (2013.01)

(58) Field of Classification Search
None
See application file for complete search history.

(56) References Cited

U.S. PATENT DOCUMENTS

2003/0081934 A1* 5/2003 Kirmuss ................. B60R 11/02
348/E7.086

FOREIGN PATENT DOCUMENTS

| WO | WO-0123214 A1 * | 4/2001 | ............... B60R 1/00 |
| WO | WO-2006050522 A2 * | 5/2006 | ............ G07C 5/008 |

* cited by examiner

*Primary Examiner* — Gerald A Smarth
(74) *Attorney, Agent, or Firm* — Hoffberg & Associates; Steven M. Hoffberg

(57) ABSTRACT

A modular intelligent transportation system, comprising an environmentally protected enclosure, a system communications bus, a processor module, communicating with said bus, having a image data input and an audio input, the processor module analyzing the image data and/or audio input for data patterns represented therein, having at least one available option slot, a power supply, and a communication link for external communications, in which at least one available option slot can be occupied by a wireless local area network access point, having a communications path between said communications link and said wireless access point, or other modular components.

20 Claims, 12 Drawing Sheets

Related U.S. Application Data

Jul. 19, 2011, now Pat. No. 9,371,099, which is a continuation of application No. 11/267,761, filed on Nov. 3, 2005, now Pat. No. 7,983,835.

(60) Provisional application No. 60/552,748, filed on Mar. 15, 2004.

(51) Int. Cl.
*H04M 7/00* (2006.01)
*H04W 84/12* (2009.01)

MODULAR INTELLIGENT TRANSPORTATION SYSTEM

CROSS REFERENCE TO RELATED APPLICATION

The present application is a

Continuation of U.S. patent application Ser. No. 15/173,165, filed Jun. 3, 2016, now U.S. Pat. No. 10,979,959, issued Apr. 13, 2021, which is a Continuation of U.S. patent application Ser. No. 14/082,264, filed Nov. 18, 2013, now U.S. Pat. No. 9,359,018, issued Jun. 7, 2016, which is a Continuation of U.S. patent application Ser. No. 13/185,991, filed Jul. 19, 2011, now U.S. Pat. No. 9,371,099, issued Jun. 21, 2016, which is a Continuation of U.S. patent application Ser. No. 11/267,761, filed Nov. 3, 2005, now U.S. Pat. No. 7,983,835, issued Jul. 19, 2011, which is a Non-Provisional of, and claims benefit of priority from U.S. Provisional Patent Application 60/522,748 filed Nov. 3, 2004.

U.S. patent application Ser. No. 14/082,255, filed Nov. 18, 2013, now U.S. Pat. No. 9,090,295, issued Jul. 28, 2015, is a Continuation of U.S. patent application Ser. No. 13/185,991, filed Jul. 19, 2011.

U.S. patent application Ser. No. 15/185,926, filed Jun. 17, 2016, now abandoned, is a Continuation of U.S. patent application Ser. No. 15/173,165, filed Jun. 3, 2016.

Each of the foregoing is expressly incorporated herein by reference in its entirety.

BACKGROUND OF THE INVENTION

The invention generally relates to a Modular Intelligent Transportation System (MITS), having an open interface for modularity and/or expandability.

There have been a number of different proposals for intelligent transportation systems, including roadside systems for monitoring conditions and communicating with nearby vehicles and/or a remote location.

These systems are, however, proprietary and generally incompatible, in that they are not intended to be synergistically or efficiently used together. Intelligent Transportation Systems (ITS) generally must be industrially and environmentally hardened, to meet the rigors of field deployment and have a long anticipated mean time between failures (MTB F). This requires, for example, that the system reside in an environmentally sealed enclosure, that the system be capable of withstanding extended heat and cold, numerous temperature cycles, and be serviced by a trained, but not necessarily expert technician. The enclosure itself may be located on the ground, mounted to a utility pole, building or other structure, suspended in the air by a cable or in any other place where there is access to a power source, including solar. In any case, the system may be subject to harsh weather conditions, lightning strikes, and cable terminations may reveal ground loops or various forms of interference. Thus, electronic systems intended for ITS are generally dissimilar from consumer or office electronics with respect to form factor, electrical interface specifications, and more generally, design. Likewise, because of the vertically integrated markets and proprietary designs of ITS systems, there tends not to be standardization of electronics between different manufacturers.

One use of ITS modules is for incident monitoring, for example to directly or inferentially determine whether an accident has occurred. Other applications for ITS modules include communications, Internet access, entertainment, accident avoidance, network cruise control, and the like.

Traffic accidents cause significant costs in terms of direct loss, consequential loss, and societal loss due to obstruction of the roadway in the aftermath of an accident. Another issue is the allocation of direct costs, for example when more than one vehicle is involved, the vehicle at fault is generally held liable for the damages.

It is possible to monitor locations that are likely places for accidents to occur, however, without intelligence, this process may be inefficient and unproductive. Likewise, without immediate and efficient communication of the information obtained, benefits of the monitoring are quite limited.

Since cellular telephone technology has become so widely adopted, the most common means by which motor vehicle accidents are reported to agencies in the U.S. is through cellular telephones. However, this is not always reliable or immediate if the victims are unable to use their cellular phones or if there are no witnesses with cellular phones to report the accident, and it fails to record an actual record of the accident, which can later be used as evidence.

Automobile accident detection systems are common in the art. Upon the occurrence of an automobile accident, it may be desirable to obtain video images and sounds of the accident and to record the time of the accident and the status of the traffic lights at the time the accident occurred. This information can then be sent to a remote location where emergency crews can be dispatched and the information further examined and forwarded to authorities in order to determine fault and liability.

A number of prior art techniques are available for predicting the occurrence of an accident. Some of these require an extended period of time for an automated system to analyze the data, and thus any report generated is substantially delayed. In others, the accuracy of the system depends on environmental conditions, such as lighting or time of day. Therefore, in order to provide an immediate and reliable response to a predicted occurrence of an accident, such techniques are suboptimal.

For example, Japanese Patent Application No. 8-162911 entitled "Motor Vehicle Accident Monitoring Device" ("the Japanese reference"), expressly incorporated herein by reference in its entirety, discloses a system for monitoring traffic accidents including a plurality of microphones and video cameras disposed at an intersection. Collision sounds are chosen from among the typical sounds at an intersection. The source of the collision sounds is determined by comparing the time differences of the sounds received by each of the microphones. Image data from the cameras is recorded upon the occurrence of the collision. However, the Japanese reference discloses a system that is constantly photographing the accident scene thereby wasting video resources.

U.S. Pat. No. 6,141,611 issued to Mackey et al. entitled "Mobile Vehicle Accident Data System" ("the Mackey reference"), expressly incorporated herein by reference in its entirety, discloses an on-board vehicle accident detection system including one or more video cameras that continuously record events occurring at a given scene. Camera images of the scene are digitally stored after compression. An accident detector on-board the vehicle determines if an accident has occurred, and if so, the stored images are transmitted to a remote site for observation. However, the Mackey reference includes video cameras on-board the vehicles themselves, increasing the likelihood that the cameras would become damaged during an accident thereby rendering them impractical for accident-recording systems.

Further, the on-board cameras' image-capturing ability is severely limited due to the constraints of the vehicle themselves. Additionally, the Mackey reference discloses a system that determines if an accident is present by the sudden acceleration or deceleration of the vehicle, without the use of fixed microphones. The invention claimed by Mackey is on board the vehicle, it does nothing to solve the problem or record an accident in two vehicles which are not so equipped. Equipping every vehicle with this system is impractical and therefore not feasible.

U.S. Pat. No. 6,111,523 issued to Mee entitled "Method and Apparatus for Photographing Traffic in an Intersection", expressly incorporated herein by reference in its entirety, describes a system for taking photographs of vehicles at a traffic intersection by triggering a video camera to capture images wherein the triggering mechanism of the video camera is based upon certain vehicle parameters including the speed of the vehicle prior to its entrance into the traffic intersection.

U.S. Pat. No. 6,088,635 issued to Cox et al. entitled "Railroad Vehicle Accident Video Recorder", expressly incorporated herein by reference in its entirety, discloses a system for monitoring the status of a railroad vehicle prior to a potential accident. The system employs a video camera mounted within the railroad car that continuously views the status of a given scene, and continuously stores the images of the scene. Like Mackey, it is impractical and therefore not feasible to equip every vehicle with this system.

U.S. Pat. No. 5,717,391 issued to Rodriguez entitled "Traffic Event Recording Method and Apparatus", expressly incorporated herein by reference in its entirety, describes a system for determining the condition of a traffic light and includes an audio sensor which monitors sound at all times. Sound detected above a certain decibel level triggers the recordation of sounds, the time of day and the status of the traffic lights. However, Rodriguez fails to disclose video cameras or any image-capturing means.

U.S. Pat. No. 5,677,684 issued to McArthur entitled "Emergency Vehicle Sound-Actuated Traffic Controller", expressly incorporated herein by reference in its entirety, describes a traffic controller system utilizing sound detection means connected to a control box which contains a switching mechanism that, in a first orientation, allows normal operation of traffic light control and a second orientation that, upon the detection of an approaching siren, sets all traffic signals at an intersection to red to prohibit the entrance into the intersection of additional vehicles.

U.S. Pat. No. 5,539,398 issued to Hall et al. entitled "GPS-based Traffic Control Preemption System", expressly incorporated herein by reference in its entirety, discloses a system for determining if a vehicle issuing a preemption request to an emergency vehicle or police car is within an allowed approach of a traffic intersection, utilizing a GPS system.

U.S. Pat. No. 6,690,294 issued to Zierden entitled "System and method for detecting and identifying traffic law violators and issuing citations", expressly incorporated herein by reference, discloses a mobile or stationary traffic monitoring system for detecting violations of speed limits or other traffic laws by vehicle operators and issuing citations to an operator and/or vehicle owner suspected of a violation using a digital camera to capture images of the operator and/or the vehicle, transmitting the captured images and other relevant data to an analysis center where the images and data are analyzed to determine whether to issue a citation and, if so, to issue the citation or take other appropriate law enforcement measures. The system captures images of a vehicle and/or vehicle operator suspected of a traffic violation, determines the time and geographic location of the suspected violation, transmits the images and other data to an analysis center, issues citations to violators and derives revenue therefrom.

U.S. Pat. No. 5,938,717 to Dunne et al., expressly incorporated herein by reference, discloses a traffic control system that automatically captures an image of a vehicle and speed information associated with the vehicle and stores the image and information on a hard disk drive. The system uses a laser gun to determine whether a vehicle is speeding. The hard drive is later connected to a base station computer which is, in turn, connected to a LAN at which the information from the hard drive is compared with databases containing data such as vehicle registration information and the like. The system automatically prints a speeding citation and an envelope for mailing to the registered owner of the vehicle U.S. Pat. No. 5,734,337 to Kupersmit, expressly incorporated herein by reference, discloses a stationary traffic control method and system for determining the speed of a vehicle by generating two images of a moving vehicle and calculating the vehicle speed by determining the distance traveled by the vehicle and the time interval between the two images. The system is capable of automatically looking up vehicle ownership information and issuing citations to the owner of a vehicle determined to be speeding.

U.S. Pat. No. 5,948,038 to Daly et al., expressly incorporated herein by reference, discloses a method for processing traffic violation citations. The method includes the steps of determining whether a vehicle is violating a traffic law, recording an image of the vehicle committing the violation, recording deployment data corresponding to the violation, matching the vehicle information with vehicle registration information to identify the owner, and providing a traffic violation citation with an image of the vehicle, and the identity of the registered owner of the vehicle.

The I-95 Corridor Coalition, Surveillance Requirements/Technology, Ch. 4., Technology Assessment, expressly incorporated herein by reference, describes a number of different technologies suitable for incident detection. For example, AutoAlert: Automated Acoustic Detection of Traffic Incidents, was an IVHS-IDEA project which uses military acoustic sensor technologies, e.g., AT&T IVHS NET-2000™. The AutoAlert system monitors background traffic noise and compares it with the acoustic signatures of previously recorded accidents and incidents for detection. See, David A. Whitney and Joseph J. Pisano (TASC, Inc., Reading, Mass.), "AutoAlert: Automated Acoustic Detection of Incidents", IDEA Project Final Report, Contract ITS-19, IDEA Program, Transportation Research Board, National Research Council, Dec. 26, 1995, expressly incorporated herein by reference. The AutoAlert system employs algorithms which provide rapid incident detection and high reliability by applying statistical models, including Hidden Markov Models (HMM) and Canonical Variates Analysis (CVA). These are used to analyze both short-term and time-varying signals that characterize incidents.

The Smart Call Box project (in San Diego, Calif.) evaluated the use of the existing motorist aid call box system for other traffic management strategies. The system tests the conversion of existing cellular-based call boxes to multi-functional IVHS system components, to transmit the data necessary for traffic monitoring, incident detection, hazardous weather detection, changeable message sign control, and CCTV control.

In 1992 the French Toll Motorway Companies Union initiated testing an Automatic Incident Detection (AID) technique proposed by the French National Institute for Research on Transportation and Security (INRETS). The technique consists of utilizing computers to analyze video images received by television cameras placed along the roadway. A "mask' frames the significant part of the image, which typically is a three or four-lane roadway and the emergency shoulder. The computer processes five pictures a second, compares them two at a time, and analyzes them looking for points that have moved between two successive pictures. These points are treated as objects moving along the roadway. If a moving object stops and remains stopped within the mask for over 15 seconds, the computer considers this an anomaly and sets off an alarm. In 1993, as part of the European MELYSSA project, the AREA Company conducted a full scale test over an urban section of the A43 motorway located east of Lyons. The roadway was equipped with 16 cameras on 10 meter masts or bridges with focal distances varying from 16 to 100 km, and fields of detection oscillating between 150 and 600 meters. Image Processing and Automatic Computer Traffic Surveillance (IMPACTS) is a computer system for automatic traffic surveillance and incident detection using output from CCTV cameras. The algorithm utilized by the IMPACTS system takes a different approach from most other image processing techniques that have been applied to traffic monitoring. Road space and how it is being utilized by traffic is considered instead of identifying individual vehicles. This leads to a qualitative description of how the road, within a CCTV image, is occupied in terms of regions of empty road or moving or stationary traffic. The Paris London Evaluation of Integrated ATT and DRIVE Experimental Systems (PLEIADES) is part of the DRIVE Research Programme. The Automatic Traffic Surveillance (ATS) system has been installed into Maidstone Traffic Control Center and provides information on four separate CCTV images. This information will be used both in the Control Center and passed onto the Traffic Information Center via the PLEIADES Information Controller (PIC) and data communications link. Instead of remote PCs there is a duplicate display of the Engineers workstation that is shown in the Control Office on a single computer monitor. The ATS system communicates data at regular intervals to the PIC. Any alarms that get raised or cleared during normal processing will get communicated to the PIC as they occur. The PIC uses the information received to display a concise picture of a variety of information about the highway region. The ATS system uses video from CCTV cameras taken from the existing Control Office Camera Multiplex matrix, while not interfering with its normal operation. When a camera is taken under manual control, the processing of the data for that image is suspended until the camera is returned to its preset position.

Navaneethakrishnan Balraj, "Automated Accident Detection In Intersections Via Digital Audio Signal Processing" (Thesis, Mississippi State University, December 2003), expressly incorporated herein by reference, discusses, inter alia, feature extraction from audio signals for accident detection. The basic idea of feature extraction is to represent the important and unique characteristics of each signal in the form of a feature vector, which can be further classified as crash or non-crash using a statistical classifier or a neural network. Others have tried using wavelet and cepstral transforms to extract features from audio signals such as speech signals. S. Kadambe, G. F. Boudreaux-Bartels, "Application of the wavelet transform for pitch detection of speech signals," IEEE Trans. on Information Theory, vol. 38, no. 2, part 2, pp. 917-924, 1992; C. Harlow and Y. Wang, "Automated Accident Detection," Proc. Transportation Research Board 80th Annual Meeting, pp 90-93, 2001. Kadambe et al developed a pitch detector using a wavelet transform. One of the main properties of the dyadic wavelet transform is that it is linear and shift-variant. Another important property of the dyadic wavelet transform is that its coefficients have local maxima at a particular time when the signal has sharp changes or discontinuities. These two important properties of the dyadic wavelet transform help to extract the unique features of a particular audio signal. Kadambe et al. made a comparison of the results obtained from using dyadic wavelet transforms, autocorrelation, and cepstral transforms. The investigation showed that the dyadic wavelet transform pitch detector gave 100% accurate results. One reason for the difference in the results was that the other two methods assume stationarity within the signal and measure the average period, whereas the dyadic wavelet transform takes into account the non-stationarities in the signal. Hence, the dyadic wavelet transform method would be the best to extract feature when the signals are non-stationary. Harlow et al developed an algorithm to detect traffic accidents at intersections, using an audio signal as the input to the system. The algorithm uses the Real Cepstral Transform (RCT) as a method to extract features. The signals recorded at intersections include brake, pile drive, construction and normal traffic sounds. These signals are segmented into three-second sections. Each of these three second segmented signals is analyzed using RCT. RCT is a method where the signal is windowed for every 100 msec using a hamming window with an overlap of 50 msec. Thus, for a given three-second signal, there will be almost 60 segments of 100 msec duration each. RCT is applied to each of these segments, and the first 12 coefficients are used as the features. The features obtained using the RCT are then classified as "crash" or "non-crash" using a neural network.

Balraj's experimental results showed that among the three different statistical classifiers investigated, maximum likelihood and nearest neighbor performed best, although this had high computational costs. Haar, Daubechies, and Coiflets provided the best classification accuracies for a two-class system. Among the five different feature extraction methods analyzed on the basis of the overall accuracy, RCT performed best. The second-generation wavelet method, the lifting scheme, was also investigated. It proved computationally efficient when compared to DWT. Thus, it was concluded that the optimum design for an automated system would be a wavelet-based feature extractor with a maximum likelihood classifier. Thus, the choice of DWT or the lifting scheme would be preferred for a real-time system.

U.S. Pat. No. 6,757,574, expressly incorporated herein by reference, shows transmission of location and identification from a traffic control device.

U.S. Pat. No. 6,373,851, expressly incorporated herein by reference, discloses an Ethernet-connected vehicle traffic control device.

U.S. Pat. No. 4,521,644, expressly incorporated herein by reference, relates to a telephone-line interconnected set of traffic control devices, which can be remotely programmed or monitored.

In any and/or all of the embodiments described herein, the systems, equipment systems, subsystems, devices, components, and/or appliances, of and/or utilized in any of the respective embodiments, can include and/or can utilize the teachings and/or the subject matter of the following U.S. Patents, the subject matter and teachings of which are hereby incorporated by reference herein and form a part of the disclosure of this patent application: U.S. Pat. No. 6,009,356 (Monroe, Dec. 28, 1999); U.S. Pat. No. 5,890,079 (Beemer, I I, et al., Sep. 7, 1999); U.S. Pat. No. 5,845,240 (Fielder, Dec. 1, 1998); U.S. Pat. No. 5,948,026 (Levine, Mar. 30, 1999); U.S. Pat. No. 5,446,659 (Yamawaki, Aug. 29, 1995); U.S. Pat. No. 5,056,056 (Gustin, Oct. 8, 1991); U.S. Pat. No. 6,718,239 (Rayner, Apr. 6, 2004); U.S. Pat. No. 6,449,540 (Rayner, Sep. 10, 2002); U.S. Pat. No. 6,684,137 (Takagi, et al., Jan. 27, 2004); U.S. Pat. No. 6,633,238 (Lemelson, et al., Oct. 14, 2003); U.S. Pat. No. 6,226,389 (Lemelson, et al., May 1, 2001); U.S. Pat. No. 6,630,884 (Shanmugham, Oct. 7, 2003); U.S. Pat. No. 6,600,417 (Lerg, et al., Jul. 29, 2003); U.S. Pat. No. 6,288,643 (Lerg, et al., Sep. 11, 2001); U.S. Pat. No. 6,281,792 (Lerg, et al., Aug. 28, 2001); U.S. Pat. No. 6,580,373 (Ohashi, Jun. 17, 2003); U.S. Pat. No. 6,574,548 (DeKock, et al., Jun. 3, 2003); U.S. Pat. No. 6,472,982 (Eida, et al., Oct. 29, 2002); U.S. Pat. No. 5,784,007 (Pepper, Jul. 21, 1998); U.S. Pat. No. 6,466,260 (Hatae, et al., Oct. 15, 2002); U.S. Pat. No. 6,429,812 (Hoffberg, Aug. 6, 2002); U.S. Pat. No. 6,252,544 (Hoffberg, Jun. 26, 2001); U.S. Pat. No. 6,389,340 (Rayner, May 14, 2002); U.S. Pat. No. 6,324,450 (Iwama, Nov. 27, 2001); U.S. Pat. No. 6,211,907 (Scaman, et al., Apr. 3, 2001); and U.S. Pat. No. 5,689,442 (Swanson, et al., Nov. 18, 1997); U.S. Pat. No. 6,647,270 (Himmelstein, Nov. 11, 2003); U.S. Pat. No. 6,574,538 (Sasaki, Jun. 3, 2003); U.S. Pat. No. 6,573,831 (Ikeda, et al., Jun. 3, 2003); U.S. Pat. No. 6,542,077 (Joao, Apr. 1, 2003); U.S. Pat. No. 6,404,352 (Ichikawa, et al., Jun. 11, 2002); U.S. Pat. No. 6,401,027 (Xu, et al., Jun. 4, 2002); U.S. Pat. No. 6,392,692 (Monroe, May 21, 2002); U.S. Pat. No. 6,339,370 (Ruhl, et al., Jan. 15, 2002); U.S. Pat. No. 6,314,364 (Nakamura, Nov. 6, 2001); U.S. Pat. No. 6,163,338 (Johnson, et al., Dec. 19, 2000); U.S. Pat. No. 6,154,658 (Caci, Nov. 28, 2000); U.S. Pat. No. 6,091,956 (Hollenberg, Jul. 18, 2000); U.S. Pat. No. 6,087,960 (Kyouno, et al., Jul. 11, 2000); U.S. Pat. No. 6,075,466 (Cohen, et al., Jun. 13, 2000); U.S. Pat. No. 5,990,801 (Kyouno, et al., Nov. 23, 1999); U.S. Pat. No. 5,943,428 (Seri, et al., Aug. 24, 1999); U.S. Pat. No. 5,699,056 (Yoshida, Dec. 16, 1997); U.S. Pat. No. 5,353,023 (Mitsugi, Oct. 4, 1994); U.S. Pat. No. 5,025,324 (Hashimoto, Jun. 18, 1991); U.S. 20040022416 (Lemelson, et al., Feb. 5, 2004); U.S. 20020008637 (Lemelson, et al., Jan. 24, 2002); U.S. 20030225516 (DeKock, et al., Dec. 4, 2003); U.S. 20020193938 (DeKock, et al., Dec. 19, 2002); U.S. 20030222981 (Kisak, et al., Dec. 4, 2003); U.S. 20030214405 (Lerg, et al., Nov. 20, 2003); U.S. 20020008619 (Lerg, et al., Jan. 24, 2002); U.S. 20030125853 (Takagi, et al., Jul. 3, 2003); U.S. 20030081935, 20030081934, 20030081128, 20030081127, 20030081122, 20030081121, and 20030080878 (Kirmuss, May 1, 2003); U.S. 20020121969 (Joao, Sep. 5, 2002); U.S. 20020147982 (Naidoo, et al., Oct. 10, 2002); U.S. 20030062997 (Naidoo, et al., Apr. 3, 2003); U.S. 20010005804 (Rayner, Jun. 28, 2001); U.S. 20020163579 (Patel, et al., Nov. 7, 2002); U.S. 20020170685 (Weik, et al., Nov. 21, 2002); U.S. 20030011684 (Narayanaswami, et al., Jan. 16, 2003); U.S. 20030041329 (Bassett, Feb. 27, 2003); U.S. 20030053536 (Ebrami, Mar. 20, 2003); and U.S. 20030067542 (Monroe, Apr. 10, 2003).

The following references are incorporated herein by references as if explicitly set forth herein:

www.itsdocs.fhwa.dot.gov/JPODOCS/REPTS_TE/36D01!.PDF;

www.ndsu.nodak.edu/ndsu/ugpti/MPC_Pubs/html/MPC01-122.html;

www.intelligenthighway.com/ITS/IMITS.pdf;

stat-www.berkeley.edu/users/kwon/papers/inc_detection.pdf;

www-users.cs.umn.edu/~masoud/publications/harini-intersection-itsc-2002.pdf;

The I-80 Experiment: Real-Time Algorithms for Travel Time Estimates and Incident Detection—Alex Skabardonis;

Dougherty, M. S., Chen, H. and Montgomery, F. (1998), Principle components based incident detection Proc. 5th International Conference on Applications of Advanced Technologies in Transportation, Newport Beach, Calif., ieeexplore.ieee.org/xpl/tocresult.jsp?isNumber=14013;

Karim, A. and Adeli, H. (2003), "Fast Automatic Incident Detection on Urban and Rural Freeways Using the Wavelet Energy Algorithm," Journal of Transportation Engineering, ASCE, Vol. 129, No. 1, pp. 57-68. www.pubs.asce.org/WWWdisplay.cgi?0300116;

Chen, H; Boyle, R D; Montgomery, F O; Kirby, H R. Novelty detection for motorway incident management in: Proceedings of the Workshop on Engineering for Intelligent Systems. 1998. portal.acm.org/citation.cfm?id=643217&dl=ACM&coll=GUIDE;

Karim, A. and Adeli, H. (2002), "Comparison of Fuzzy Wavelet Radial Basis Function Neural Network Freeway Incident Detection Model with California Algorithm," Journal of Transportation Engineering, ASCE, Vol. 128, No. 1, pp. 21-30, www.pubs.asce.org/WWWdisplay.cgi?0200117;

Chien-Hua Hsiao, Ching-Teng Lin, and Michael Cassidy, "Application of Fuzzy Logic and Neural Networks to Automatically Detect Freeway Traffic Incidents", Journal of Transportation Engineering, Vol. 120, No. 5, September/October 1994, pp. 753-772;

A. Samant & H. Adeli, "Feature Extraction for Traffic Incident Detection Using Wavelet Transform and Linear Discriminant Analysis", Computer-Aided Civil and Infrastructure Engineering, Volume 15 Issue 4 Page 241 (July 2000);

Hojjat Adelil and Asim Karim, "Fuzzy-Wavelet RBFFN Model For Freeway Incident Detection", Journal of Transportation Engineering, Vol. 126, No. 6, November/December, 2000;

H. Veeraraghavan, O. Masoud, N. P. Papanikolopoulos, "Computer vision algorithms for intersection monitoring", IEEE Trans. on Intelligent Transportation Systems, vol. 4, no. 2, pp. 78-89, June 2003;

K. Stubbs, H. Arumugam, O. Masoud, C. McMillen, H. Veeraraghavan, R. Janardan, N. P. Papanikolopoulos, "A real-time collision warning system for intersections", in Proc. ITS America 13th Annual Meeting, Minneapolis, Minn., May 2003;

H. Veeraraghavan, O. Masoud, N. P., Papanikolopoulos, "Vision-based monitoring of intersections", in Proc. IEEE 5th International Conference on Intelligent Transportation Systems, pp. 7-12, Singapore, September 2002;

Petty, K., Ostland, M., Kwon, J., Rice, J. and Bickel, P. (2002) "A New Methodology for Evaluating Incident Detection Algorithms," Transportation Research, Part C, Volume 10, pp. 189-204;

Peter T. Martin, Joseph Perrin, Blake Hansen, Ryan Kump, Dan Moore, "Incident Detection Algorithm Evaluation" (University of Utah, Prepared for Utah Department of Transportation) March 2001; and Dastidar, Samanwoy & Adeli, Hojjat (2003), "Wavelet-Clustering-Neural Network Model for Freeway Incident Detection.", Computer-Aided Civil and Infrastructure Engineering 18 (5), 325-338.

Wireless local area networks and wide area networks are well known, and are the subject of many accepted standards, such as encompassed by the IEEE-802.11 standards and proposed standards, including for example 802.11a, 802.11b, 802.11h, 802.11R/A (DSRC), as well as various IETF RFC's. These will not be discussed herein in detail, but are well known to those of ordinary skill in the art, and it is understood that the content of these is incorporated herein by reference as if fully set forth herein.

SUMMARY OF THE INVENTION

Intelligent Transportation systems typically require distributed electronics systems physically located near the transportation infrastructure. For example, sensors, controls and communication systems are typically not fully centralized. Environmentally sealed enclosures are well known for this application, for example NEMA-3, 3R, 3S, 4, 4X, 6 and 6P.

See, www.nema.org/index_nema.cfm/1427/B9A5681E-0C0C-4248-A032BE08D6B002B3/

This physical infrastructure provides a unique opportunity to provide nearly seamless coverage of populated areas with wireless local area network or wide area network coverage, supporting both stationary and mobile transceivers, particularly in areas with a high concentration of intersection and traffic control devices. Further, through integration of the access point into the intelligent transportation system, various telematics and intelligent highway control applications are supported. Thus, since available wireless local area networks (WLAN) provide relatively high bandwidth at low cost, entertainment applications may also be supported.

The WLAN and ITS integration provides a unique opportunity for vehicular coordination and traffic intersection control, since direct communications in real time between vehicles, public safety or emergency personnel, and the ITS infrastructure is facilitated. For example, traffic light timing may be dynamically adjusted for maximum efficiency and/or public safety, and enhanced communications directed at cooperating vehicles may provide enhanced control and warning options, and, for example, the ITS may provide a visual indication (e.g., transmitted video) representing prospective conditions that the vehicle may encounter or seek to avoid.

Examples of applications that can be incorporated into this design include providing seamless wireless Internet connectivity to an entire area, locating and tracking vehicles, people or objects equipped with transponders, and components of traffic information systems to provide traffic information which is relayed or sent directly to subscribers. Some of these applications may be incorporated into a main system, like an accident detection and reporting system, where a power source and other components are readily available, and lend themselves readily to integrating other components. Applications that lend themselves to charging of user access fees may even be used to defray the cost of the main system.

Typically, the controller for an ITS system is not a personal computer, nor does it operate using a graphic user interface (GUI) shell or operating system for its normal operation, although for diagnostics and setup, a GUI may be provided. Thus, while the electrical and low-level communications standards may be shared with personal computers, the higher level protocols and application programming interfaces (APIs) may differ. The ITS system is typically a real time system, and therefore essentially non-deterministic operating systems are avoided. On the other hand, if the level of non-determinism can be limited to an acceptable worst case, then it is possible to use such an operating system. For example, both Windows XP/CE and Linux both have variants which are intended to be deployed in real time environments. In any case, the operating system for the main system may be transparent to the optional module, except where the module comprises software to be executed in the main system processor.

In fact, an important aspect of the ITS with WLAN is that by employing standards-based design, it is not necessary to now contemplate or understand all of the potential uses for the system. Clearly, those functions which are desired may be made a standard part of the system. Rather, it is an important part of a preferred embodiment of the invention to provide a distributed Intelligent Transportation System infrastructure which is not particularly functionally limited by the initial design decisions made during original manufacture, and to allow open or proprietary additions to the system after-the-fact.

The present invention provides a physical environment, electrical and logical interface for at least one module within an enclosure located near a roadway, as part of an intelligent transportation system distributed infrastructure. Preferably, the module is optional, and makes use of material resources of the main system collocated within the enclosure particularly its power supply, communication link and in some instances its location information. Therefore, one or more sensors, traffic control device controllers, and communications facilities may be shared between the main system and the optional system, leading to economies and higher integration. Typically, at a minimum, a computer readable software program storage media is provided in the module, with all hardware resources provided directly by the main system. However, in this case, the functionality might more efficiently be directly integrated in the main system without the segregation, which, for example, comprises an electrical connector or slot which allows removal of the module. More commonly, the module also comprises specific hardware which is not a normal part of the main system, which is employed in fulfilling the function of the module. For example, the module may comprise a communications system, a sensor interface system, or a processor or co-processor.

Accordingly, the module may be contained in an external environmental enclosure and connected to the main system through an external interface, or it may be contained inside the enclosure of the main system, utilizing its resources through a similar interface inside the main system enclosure.

Examples of applications that can be incorporated into this modular design include providing seamless wireless Internet connectivity to an area proximate to the system, locating and tracking vehicles, people or objects equipped with transponders, and components of traffic information systems to provide traffic information which is relayed or sent directly to subscribers. Some of these applications may be incorporated into a main system, like an accident detection and reporting system, where a power source and other components are readily available, and lend themselves readily to integrating other components. Applications that lend themselves to assessment of user access fees may even be used to defray the cost of the main system.

The enclosure of the main system may accommodate one or more modules. Each module is designed to fit within a specified space, and having a standardized mechanical interface. For example, the module may meet specifications for an ISA, EISA, MCA, PCI, PC-Card (PCMCIA) or other home or office computer-based standard. The module might otherwise correspond to a VME or other industrial computer form factor standard. In the above-identified standards, a basic electrical interface is specified, and further a communications protocol defined as well. In other cases, a separate electrical and/or communication protocol may be employed, for example USB 1.0, USB 1.1, USB 2.0, IEEE-1394, IEEE-1488, RS-232, RS-423, SCSI, SCSI-II, Fast/wide/fast+wide SCSI, IEEE-802.x (thin Ethernet, thick Ethernet, Token Ring, etc.), T-1, ISDN, DSL, ADSL, DOCSIS, ATA, SATA, SCA, SCA-2, etc.

Typically, the controller for an ITS system is not a personal computer nor does it operate using a graphic user interface (GUI) shell or operating system for its normal operation, although for diagnostics and setup, a GUI may be provided. Thus, while the electrical and low-level communications standards may be shared with personal computers, the higher-level protocols and application programming interfaces (APIs) may differ. The ITS system is typically a real time system, and therefore essentially non-deterministic operating systems are avoided. On the other hand, if the level of non-determinism can be limited to a worst case, then it is possible to use such an operating system. For example, both Windows XP/CE and Linux both have variants which are intended to be deployed in real time environments. In any case, the operating system for the main system is typically transparent to the optional module, except where the module comprises software to be executed in the main system processor.

The enclosure is typically environmentally sealed, eliminating a requirement for the module to have its own environmental sealing, and permitting use of unsealed or card-edge connectors, although a module can also be contained in an environmentally enclosure, and designed to connect externally to the module of the main system which then has appropriate connections to accommodate the external module.

In one embodiment, the module meets the size and electrical interface requirements for a blade server, for example designed to fit within a standard rack mount, and employing standard power and communications interfaces. The module can be specified to fit in a 7U height EIA-310-D standard 19" rack, with full, ½, ⅓, ¼, ⅙, or 1/12 width (including required clearances).

In cases where the enclosure is small, for example in the case of a cable-suspended enclosure, correspondingly smaller form factors may be employed, such as PCI and cardbus. A logical module (defined by its consolidated function) may span one or more physical slots or connectors.

According to a preferred embodiment, data communications between the module and main system employ IEEE-802.3u interface using TCP/IP protocol. This interface provides standardized connectors, communications, and symmetry. While it is non-deterministic, in a controlled environment with peak demand well below capacity, the deviations from ideal are small. This also allows communications with sensors using the same interface, and allows the sensors and other resources to be shared between the main system and modules. Other Ethernet systems, such as 802.11x may also be bridged. Further, this also facilitates communications external to the enclosure, although it is preferred that communications occur through a firewall and, if on a shared physical network such as the Internet, that a virtual private network (VPN) be implemented.

A preferred embodiment of the MITS comprises an environmentally hardened single board computer design that does not require a cooling fan for the processor, and which is operable over the range of environmental temperatures typically encountered in traffic control device enclosures. Non-mechanical cooling, such as heat pipes, Peltier coolers, or the like, may be employed as necessary.

The single board computer (SBC) may comply with, for example, PC/104, PC/104 Plus, EPIC™ CompactPCI, STD 32, ETX, VME, ESM, or EBX specifications. The SBC may operate under various operating systems, including for example, Linux or variants thereof, Windows XP, WindowsCE, and VxWorks®. The module may also include so-called "blade servers" and associated components, available from various vendors according to various specifications. In general, the MITS will have line power available, and may therefore include a temperature regulated heater to prevent lower temperature extremes from limiting system function. However, it is preferred that the MITS be capable of operating at elevated temperatures without environmental control. One acceptable SBC is a Micro/sys (Montrose, Calif.) SBC 4495-1-ET, which is an extended temperature range EPIC standard SBC, which comprises a 486DX processor, GPS (4495OPT19), digital and analog I/O, 10/100 BaseT Ethernet, CompactFlash connector, and PC104 bus interface. Alternately, the MSEBX from DIGITAL-LOGIC AG, (Luterbach CH-4542), www.digitallogic.ch, which supports audio and video inputs directly, may be employed. The storage for programs and data to be preserved is preferably in CompactFlash memory, and the system may have 512 MB-8 GB of storage capacity, for example. As memory density increases and costs decrease, far greater storage capacities will, of course, be feasible. Also available, but not preferred as system data busses, include ISA, EISA, MCA, PCI, and other common personal computer bus architectures not particularly intended for environmentally hardened applications.

The enclosure for the SBC and optional hardware is preferably environmentally sealed against weather, and preferably provides at least one open slot for hardware expansion. Preferably, the enclosure has a capacity to add at least two additional system bus-based expansion cards, beyond the basic SBC. In this manner, added hardware need not employ redundant hardware features, and may employ the resources of the SBC and existing peripherals. One expansion card which may be of particular use is an acoustic signature detection and analysis card, which employs, for example, one or more digital signal processors. Another expansion card which may be of use is a digital video compression card, for example compressing video streams captured at the scene into an MPEG-4 format. If cryptographic processing burdens are beyond the capabilities of the SBC, a cryptographic coprocessor card may be provided. Video analysis, and in particular video scene simulation to provide a two-dimensional model of the scene or location based on inputs from multiple video camera sources and optionally other sensors, may be performed on a separate optional card. This video scene analysis allows, for example, the agent and the remote monitoring center to receive a single video representation of conditions at the scene, synthesized to represent a virtual view, such as looking down, or interactively defined by the agent, without having to transmit all of the raw video data in realtime. Where relevant, the raw video data (in digitally compressed form, and cryptographically authenticated), may be stored locally until it is either no longer needed or successfully transferred to the remote location, as confirmed by a message from the remote location.

Because of the public safety issues raised by the Intelligent Transportation System infrastructure, it is generally preferred that any additions or modifications to the system, either hardware or software, be certified by a certification authority for function, compatibility, and security, prior to deployment. Likewise, the MITS preferably includes an available means for updating and patching, as updates are produced, vulnerabilities discovered and remediated, or where changes to system or optional software are desired. These communications can occur through a satellite radio link, similar to XM Radio or Sirius, wired or wireless terrestrial network, or the like. For example, one link to each MITS may include an IEEE-802.16x (WiMax), digital subscriber line (DSL) or 3G cellular radio for data communications, which would allow communications directly to each module. In each case, it is preferred that a more reliable backup system be available, since WiMax, DSL and cellular services are subject to various quality of service impairments and untariffed repair limitations. The backup system may be, for example, an ad hoc radio network (mesh network), for example using the various MITSs as dispersed nodes, using licensed public safety spectrum. The ad hoc network is, for example, a multihop network, or other known scheme. The network may include or exclude mobile nodes, and may have redundant communications paths using the same or different physical transport layers (e.g., various types of optical, wired or wireless). Permanent use of public safety licensed spectrum by the MITSs may be imprudent, since this might consume valuable bandwidth which might otherwise be available for other uses.

One embodiment of the present invention provides, as a basic function of the MITS, is a vehicle accident detection and data recordation and transmission system that places one or more video cameras, microphones and data collection and transmission apparatus in proximity to traffic intersections, or other desired locations, to monitor local conditions, and, for example, to detect, store, and archivally retain accident-related images and sounds, together with other accident-related data such as time and location, and to relay data to real-time monitoring centers, where the information can be reviewed immediately for the purpose of screening false alarms, assessing the severity of the accident and dispatching an appropriate level of emergency response. To this end, one aspect of the present invention provides business models for financing at least a portion of the system by imposing usage fees for to access to communications resources and/or real-time or archival data obtained from one or more of the systems According to the present invention, a system is provided to monitor the sounds at a traffic intersection (or other location where monitoring is desired), such that when certain sounds are detected that indicate an automobile incident (such as an accident) is imminent or is in process, the system records the audio, video and other information pertinent to the incident such as location, time, state of the traffic control signals (if any and if desired), and transmits the data to a remote control center where the state of the accident scene can be assessed, an appropriate response dispatched to render assistance, and the accident related data can be archived for later use in assessing fault and liability by the authorities, the courts and the insurance companies representing the parties to the accident for assessing. The location and time of the accident detection are determined with a high degree of accuracy, for example, by using a satellite navigation system receiver such as the existing Navstar Global Positioning System (GPS) currently in use by the United States government. To alleviate the need for any major modifications to the existing traffic control infrastructure, the system preferably uses existing wireless systems or networks, such as cellular (2G, 2.5G, 3G, etc), WLAN (IEEE 802.11x), direct broadcast transmission, ad hoc (mesh) networks, microwave or laser transmission, or other type communications, to transmit the accident data, and utilizes existing monitoring services as control centers to receive and process the accident. The basic hardware components of the invention are commercially available, although dedicated, customized, and/or highly integrated systems may also be made for this purpose. By providing immediate notification of accident conditions, as well as live or near real-time video feeds, public safety officials are provided with enhanced tools, and public safety is enhanced. Further, the present invention provides enhanced homeland security, by providing improved monitoring of the public infrastructure.

A particular advantage of a preferred embodiment of the present invention is that data screening is provided prior to transmission, based on an intelligent analysis of the environment, including logical analysis and heuristics. By providing appropriate filtering of the feeds, as well as the capability to transmit raw data, or relatively unprocessed feeds, a human operator can assess the situation. This human data presentation aspect means that the error threshold may be set at a level which minimizes or eliminates the false negatives, while limiting the false positives to an acceptable level. Therefore, the human monitors can be used efficiently.

The present system and method will therefore save lives and improve public safety by facilitating almost instant reporting of traffic accidents or other events on streets and intersections and locations so equipped, and will save time and money of the part of the authorities, courts, insurance companies and the accident victims by creating an audio and video record of the accident which can be use to determine fault and liability. Other potential benefits to society include minimizing the dispatching of emergency medical response teams to incidents where they are not needed, thereby leaving these resources more readily available for true emergencies, and a reduction in the burden on the judicial system, as the parties to an accident and their representatives will have undisputable evidence of fault making out-of-court settlements more likely.

The present system also permits monitoring of various locations by centralized monitoring centers, or even by persons seeking the data, which would not be considered highly confidential. That is, if a driver wishes to investigate the traffic at a particular intersection, he could use a video-enabled phone, such as a video-conferencing cellular phone, to communicate with the monitoring device (or more likely, with a server system which communicates with the monitoring device, to allow multicasting and arbitration of access, as well as cost accounting), to view and/or listen to conditions at the monitored location. Of course, in sensitive situations, data encryption and/or user authentication may be provided to secure the data stream.

The ability for the public to access the location monitoring system data provides a means for subsidy of the deployment of the system, for example through a subscription, pay-per-use, or advertising-subsidy model. Thus, the cost impact on the agency may be blunted, while permitting a longer-term view of the costs and benefits of the system. The agency can also assess the at fault party with a fine or charge, assessing the costs of implementation of the system on those who directly benefit or are found liable for an incident detected. The incident records may be used to support imposition of the fee. The agency may also impose an access fee for the data. The system is also sufficiently flexible as to enable alternate embodiments to be adapted to include ancillary uses, such as traffic signal and speed enforcement.

Adding such features has the potential to generate additional revenue for agencies operating the invention, while potentially improving traffic safety which should in turn help to minimize the number of accidents.

The ability to initiate a stream from a location monitoring system generally arises from the use of a standard communications system, rather than a dedicated and/or proprietary communications system. Therefore, it is preferred that the location monitoring system communicate over public communications infrastructure, such as cellular, wired telephone/DSL/WiMax/Cable modem, Internet, unlicensed spectrum using industry standard protocols, licensed spectrum using any of various modulation schemes and protocols, or the like. Of course, the use of such public communications infrastructure is not required. It is also optional for the location monitoring system, especially for public safety applications, to have a backup communications system, so that in the event of a failure or interference, the system remains operational. Preferably, when used, the redundant systems operate through a different physical communications layer, and are thus subject to different types of interference and modes of failure.

A preferred embodiment incorporates one or more sound capturing devices and one or more image-capturing devices connected to a control unit to listen for accident-related sounds and to capture audio and video images of an accident. The control unit contains Random Access Memory ("RAM") and data processing and storage capabilities for processing and storing audio, video, location, time and other accident-related data such as the state of any traffic signals at the time of the accident if any are present, and for communicating with and accepting command and control from a remote location. Also contained within or connected to said control unit are a satellite navigation system receiver or other means for capturing, recording and reporting the location and time of an accident, and a means for communicating with a remote location which can be a wireless transceiver, wired or wireless network connection or a direct connection to the Public Switching Telephone Network ("PSTN"). The communication means is also used by the control unit for initiating contact with a remote location for the purpose of reporting and transferring accident-related data to the designated remote location, and for receiving command and control signals from said remote location. A particular advantage of using a GPS geolocation system is that it provides accurate location and time data, while alleviating the need to program the location monitoring device with identification or location data, or to track the identification of each location monitoring device at a central station. The devices are therefore self-registering based on their reported accurate location, facilitating installation, maintenance, and service.

The control unit and its components together with sound and image-capturing devices connected to (or contained within) said control unit are positioned proximate a desired location such as traffic intersection or busy street. Acoustical data received from the sound capturing devices is processed in the control unit to determine if those acoustical sounds meet predetermined threshold levels or signature patterns that indicate an accident is about to occur ("preliminary sounds") or is in the process of occurring ("qualifying sounds"). In the preferred embodiment, the control unit uses RAM or other data storage means as a buffer, and continually stores in the buffer all audio signals and video images of the desired location in a loop or circular buffer that retains data for a specified period of time, overwriting audio and video that exceeds the specified period of time. Of course, it is also possible to continuously record the data or stream it from the monitoring device, though this is not necessarily efficient. The temporary storage system or buffer may include dynamic random access memory, static random access memory, persistent electrically programmable and erasable memory of various kinds (EEPROM, Flash, ferroelectric, etc.), rotating magnetic media, magnetic tape recording media, rewritable optical storage media, magneto-optical media, holographic storage media, or the like. Non-rewritable memory may also be used to form a permanent archive of various events.

When a qualifying sound is detected, the system stops overwriting old information in the circular buffer, thereby saving audio signals and video images leading up to the qualifying sound, and continues saving subsequent audio and video until the control unit is reset. The data is, for example, transferred from the circular buffer to a persistent storage device. In this embodiment, the system is not dependent on preliminary sounds, and is designed to capture the events leading up to an accident.

In the event that communications with the monitoring center are unavailable, the data is preferably retained locally until retrieved. Since secondary accidents are common, it is preferred that the system continue to monitor and/or record data from the accident or event scene for some time after initial triggering.

In another embodiment, preliminary sounds can be used to start recording of audio signals and video images. These alternate embodiments do not necessitate continually storing images leading up to a qualifying sound as all audio and video signals following a preliminary sound are stored. In these alternate embodiments, when preliminary sounds are detected, the control unit begins storing audio signals and video images of the desired location ("the accident scene") in the RAM or data storage means. When qualifying sounds are detected within a predetermined amount of time after detection of preliminary sounds, the control unit continues storing audio signals and video images of the accident scene and also stores the time and location data from the satellite navigation receiver or other means for determining time and location, and the wireless transceiver or other communication means initiates contact with the designated remote location ("the monitoring center"). If qualifying sounds are detected without being preceded by preliminary sounds, then the control unit begins storing all audio, video, location, time and other accident related data, and initiates contact with the monitoring center immediately.

If a qualifying sound is not detected within a predetermined amount of time after a preliminary sound is detected, the stored audio and video signals that followed the preliminary sound may be discarded and the control unit resumes waiting for the next preliminary or qualifying sound to be detected.

The preferred embodiment therefore allows deferred processing of the sensor data, and allows decisions to be made after more complete information is available. For example, after a preliminary sound is detected, instead of focusing on the qualifying sound, the video data may be analyzed for evidence of an accident. A particular characteristic of a collision is a rapid deceleration. This can be detected in a video scene, for example, by analyzing motion vectors. However, without the audio analysis, the video analysis alone might produce many false positives, which would limit the ability of a small number of human agents at a central monitoring center to handle a large number of remote sensing systems.

When contact with the monitoring center is established after a qualifying sound is detected, the control unit transmits the location and still or moving video images of the accident scene which are displayed, for example, on a video monitor at the monitoring center. The determination of whether to use still or moving images at this step may be preprogrammed into the control unit according to predetermined user preferences which may be determined in part by the available bandwidth of the communications means being utilized, and the preferences of the agency implementing the system. In general, the data will be presented to monitoring agents in a standardized format. It is also possible to generate a synthetic view of the scene for an agent, for example by processing and combining data from a plurality of sensors into a single displayable presentation. For example, the standard view may be an overhead view without parallax. The view may be generated by combining video data from one or more video cameras, and processing the data to project it into the desired framework. Audio data may also be processed into a standard format, regardless of where the microphones are located.

The person at the monitoring center ("the operator") can then determine the location of and assess the accident scene, notify the proper authorities and relay the information needed by said authorities so they can dispatch the appropriate emergency response. Such information may include the number of vehicles involved, potential injuries, presence of fire, severity of the wreckage, obstruction of traffic, all of which can help the authorities dispatch the appropriate response and determine the best direction from which to access the accident scene. Further, the raw data, from the original incident and also in real time, may be made available to the authorities for analysis and location scene management. In some embodiments, it may be desirable to enable the operator to manage the traffic signals at the accident scene to facilitate access to emergency vehicles. Instead of using an already existing monitoring center, it may be desirable for the agency to implement its own monitoring center or integrate the system into an existing dispatching system.

The stored audio signals, video images, time and location data and other data about the accident scene such as the state of the traffic lights ("accident-related data") is then transmitted to and saved at the monitoring center or another remote location so as to create a permanent record of the accident-related data. When the accident-related data has been successfully transmitted and permanently stored, a command or confirmation signal may be sent to the control unit that resets the control unit, and permits the connection to be closed, if appropriate. For example, the command may instruct the RAM and data storage means to be cleared and reset. While the raw data is continuously monitored, the analysis may proceed in stages. After "reporting" an incident, the control unit may then revert to its normal monitoring and analysis modes, e.g., detecting of preliminary or qualifying sounds depending on the embodiment.

The communication means in the control unit is also used for command and control in order to program and managed the control unit remotely, perform diagnostics and troubleshooting, and to otherwise manage the control unit and its components from a remote location such as the monitoring center or other remote facility. Security means can be used to prevent unauthorized access to the command and control programming of the control unit. Such means may include password or cryptographic access restriction, channel and/or user authentication, and/or physically (private network and/or unshared physical communication channel) or logically (virtual private network) closed communication systems. The security system may also encompass a so-called "firewall" which inspects various characteristics of a communication over a shared physical communication channel and grants or denies transfer of the information accordingly. The security system may therefore completely limit access, limit modification or alteration of settings, such as command and control settings, or stored data representing the forensic evidence to be preserved and authenticated, or some combination of the above. Protection of the data content against tampering is preferably by both physical and cryptographic processes, wherein the data is cryptographically authenticated for both time of acquisition and content at or near the time of creation, in a manner where exact recreation is nearly impossible. The various times may be relevant to the operation of the system and use of the resulting data. Typically, each image will be associated with a timecode, that is, a code representing the time (absolute or relative) the image was created, which will normally be communicated with the images or video signal. Typically, there will be various timecodes, including those associated with images, but possibly also without associated images, such as a time of relevant traffic control device changes (such as the time a traffic light turns red), a time of detection of an acoustic signal representing a preliminary sound anticipating a vehicular incident or non-vehicular incident, a time of a determination that a vehicular or non-vehicular incident has occurred, or other times. Since a portion of the data to be transmitted to the remote location is not transmitted in real time, it is clear that transmitted timecodes in non-real time data will differ from an actual time of transmission. It is also clear that there will be minute differences between the actual time of the sounds leading up to such detection and determination, and the time of such detection and determination, as there will be a lag between the time of the sound and the time it is received and processed. While the differences are negligible, it is possible to determine the actual time of an imminent or actual incident, and the state of the traffic control device at such times, by correlating the time of acoustic data with corresponding images (for example, a given image with a time stamp may show an actual collision fractions of a second before it was detected). In the case of real time transmissions, the criticality of including timecodes is diminished, since these can be recreated on receipt. On the other hand, in order to detect tampering of transmissions, the use of such timecodes may be important, and a comparison of a transmitted timecode with an anticipated timecode may be useful. While a current time may be determined based on a free-running clock, advantageously, the precise time may be extracted from a satellite or network signal, since in a preferred embodiment, satellite and/or network data feeds are continuously available. In particular, since GPS technology is a time dependent, a very precise clock is available as part of a GPS receiver.

The system may acquire data representing both vehicular and non-vehicular incidents. One example of a non-vehicular incident is a gunshot. Because the acoustic sensors can readily acquire acoustic signatures indicative of a gunshot, and a plurality of acoustic sensors can triangulate the location of a gunshot, a reporting of this type of incident, especially in conjunction with video representing the scene at the time of detection, may be very useful, especially in high crime areas. Further, because the timing of events can be determined very accurately based on GPS-associated time-codes, the acoustic sensors from a plurality of locations can be used to determine a location of the event, even if it is somewhat distant or out of line-of-sight. Preferably, this multi-location sensing is coordinated at a remote monitoring center, although direct communications between locations may also be used to coordinate analysis and reporting.

Another application of the preferred system for non-vehicular reporting is explosion or bomb blast incidents. While such occurrences are relatively rare, the analysis and reporting is available without substantial hardware adaptation, and thus may be implemented using software in a basic vehicular incident detection system. Further, because the bomb blast or explosion acoustic signature would require analysis by the system and distinguishing from vehicular incidents, the incremental efforts required to preserve data and report the event would not be a significant burden on the system.

The control unit and other components of the system may also contain or be attached to backup batteries to provide power in times of electrical failure. When used, the preferred method for keeping these backup batteries charged is by direct electrical connections, although solar means or other means for keeping batteries charged may be employed. In alternate embodiments where the sound-capturing means and image-capturing means are connected to the control unit by wireless means, those devices can also be equipped with backup batteries.

Typically, the control unit will be mounted on or near traffic signals, thus providing a good vantage point, access to power, and relative freedom from vandalism.

Specifically, a preferred embodiment of the present invention provides a system for determining the occurrence or imminent occurrence of an automobile accident at a given location such as a traffic intersection or busy street, and for capturing and processing relevant accident-related data including audio, video, time, location and traffic signal information if present, and for communicating with and transmitting the accident-related data to a remote location which may be the proper authorities or a facility capable of notifying the proper authorities, and to create a permanent record of the accident related data which can be used to determine the cause of the accident, assess fault, and used as evidence in any subsequent legal proceedings.

In the preferred embodiment, the control unit contains random access memory ("RAM"), data processing means such as one or more microprocessors and other circuitry needed for the components of the system to function, and a hard drive or other non-volatile storage medium for persistent data storage, in a self-contained housing. The RAM is used to capture and temporarily store acoustical, video and accident-related data, command and control signals, and interface to operate the components of the system. The hard drive or other storage medium is used to store accident-related data, command and control signals, and programming for the system. The data processing means controls the function of the system and its components as explained in more detail below. In alternate embodiments, programming for the system can be maintained in the data processing means and accident-related data can be stored exclusively in the RAM memory or in place of a hard drive, accident related data can be saved on one of many possible storage means including optical and tape drives, flash memory or other data storage means currently in use or which may be invented in the future, the object being to have the capability of storing data including accident-related data and command and control signals and programming. In yet other alternate embodiments, in place of RAM alternative data storage means such as flash memory may be utilized to temporarily store the acoustical signals, video images, other accident-related data and command and control signals.

It is understood that, while in a preferred embodiment, the filtering of the data stream occurs within the control unit, that in alternate embodiments that data may be transmitted for remote analysis. However, a common feature of both these embodiments is that the data is filtered before presentation to a human agent as part of an accident management system.

The control unit, together with one or more sound capturing devices such as microphones, and one or more image capturing devices such as video cameras are placed strategically about the desired location. The desired location can be any place where automobile accidents are likely to occur, such as busy stretches of road or intersections.

The microphone and video cameras are connected to the control unit so the control unit can receive and process acoustical data from said microphones and video images from the video cameras. This connection may be direct, or by wireless means such as a wireless network, Bluetooth, infrared, or any other wireless means of connecting two devices. In alternate embodiments, the microphones and video cameras may be contained within the housing of the control unit.

In alternate embodiments, a plurality of control units in close proximity may communicate with each other, for example using a wireless network or ad hoc network. In cases where the sensor systems of such control units overlap, the qualifying or preliminary sounds detected at one control unit may be used to commence recording at another control unit, to thereby increase the available data. A networking of control units allows a large sensor network to track events over a broad geographic region. This network may, for example, be used to track the movements and/or driving patterns of vehicles around an incident, and to identify and track drivers who leave the scene of an accident.

The microphones and video cameras can be placed anywhere about the desired location including on or underneath traffic signals, attached to utility poles or other structures such as nearby buildings. The object is to position one or more microphones and video cameras such as to be able to detect acoustical signals coming from about the desired location and to provide useful images of an accident at the desired location including the occurrence of the accident itself, pre- and post-accident images of the desired location, vehicle identification information, injured parties, and the state of the traffic signal before during and after the accident.

In the preferred embodiment, if the desired location is an intersection equipped with traffic control signals, one of the video cameras can be directed at the traffic signal, or be positioned to cover a portion of the traffic signal in order to record and communicate its state before, at the time of, and immediately following an accident. This advantageously bypasses a logical indication of traffic control device state, which can in some instances be in error.

In alternate embodiments, in addition to or in place of using video images to record the state of the traffic control signal, the control unit is connected directly to the traffic signal control device by wired or wireless means, and can record the state of the traffic control signal electronically when preliminary or qualifying sounds are detected.

While microphones and video cameras are the preferred means for capturing acoustical signals and video images, other sound capturing means and image capturing means currently in use or invented in the future may be utilized for this purpose.

At intersections or other roadways with existing sensors, such as ground loops or weight sensors, the system may interface to these sensors to provide additional information.

The control unit also uses a satellite navigation system and communication means. In alternate embodiments these may be external to the control unit and connected to the control unit either directly or by wireless means as with other components of the system.

In the preferred embodiment, the satellite navigation system receiver is a NAVSTAR Global Positioning System ("GPS") receiver, and is mounted inside the control unit. The GPS receiver is used for determining the exact location and time of an accident.

Using a GPS receiver to determine location and time is highly accurate and enables the invention to be deployed anywhere without the need for additional programming. This simplifies the deployment process and eliminates the possibility of recording and transmitting an incorrect location or erroneous timestamp.

The highly accurate and reliable GPS system is operated by the United States government and is the preferred means to use with this invention to determine location and time. However, in alternate embodiments, any satellite navigation system such as GLONASS or some of the commercial systems now in the planning stages or to be developed can be utilized for the purpose of obtaining location and timing data. In other alternative embodiments, means other than a satellite navigation system receiver can be used for determining time and location including but not limited to internal time keeping means, programming of the location or identification information into each individual unit, using land-based navigation signals, or determining of location using one or more cellular or wireless transmission towers.

In the preferred embodiment, the communication means is a wireless transceiver housed inside the control unit, and can be any one of the standard cellular transceiver technologies, including but not limited to analog cellular (AMPS), Cellular Digital Packet Data (CDPD), Microburst, Cellemetry, digital cellular, PCS GSM, GMRS, GPRS, CDMA, TDMA, FDMA, or any other wireless communication means, including so-called 2.5G and 3G technologies. If necessary, an optional modem is used to convert the signal from analog into the correct digital format. In alternate embodiments, RF technologies like two-way radio can be used which may also require a modem, or the control unit can be connected directly to the remote monitoring center over the public switching telephone lines (PSTN), or by a wired or wireless network.

In the preferred embodiment, the communication means can also receive an incoming connection from a remote location for the purposes of diagnostics and troubleshooting, adjustments to programming, command and control and to reset the unit. For example, if construction is taking place in the vicinity of the control unit, it can be temporarily disabled or programmed to ignore those particular construction sounds to minimize the risk of a false alarm. Command and control features can permit remote adjustment of microphone and camera levels, disabling a malfunctioning microphone or camera, and resetting or disabling of the control unit. Security means can be utilized on the incoming connection in order to minimize the risk of unauthorized users gaining access to the control unit programming. Such means for securing electronic devices are numerous, well known in the art, and need not be discussed further here.

Regardless of how communication from and to the control unit is achieved, the object is to have a means for the control unit to contact the desired remote location and to transmit the accident-related data for reporting and permanent storage, and to enable command and control of the control unit from a remote location.

In operation, the control unit continually receives input of acoustical data from the microphones. This acoustical data is processed in the control unit to determine if the acoustical data received from the microphones match the acoustical pattern of sounds that indicate a motor vehicle accident is about to occur ("preliminary sounds") or that a motor vehicle accident is occurring ("qualifying sounds"). For example, the sound of skidding tires is often followed by a collision of vehicles.

In order to differentiate accident-related sounds from ordinary sounds that occur at a traffic location, baseline or threshold acoustic signatures of various accident sounds (or models, algorithms, or descriptions thereof, or matched filters therefor) are stored in the control unit, and all acoustical data received from the microphones are measured and compared against these threshold acoustic signatures to determine if they are ordinary sounds, preliminary sounds or qualifying sounds. For example, the sounds received may match an acoustic signature of skidding tires (preliminary sounds) or the acoustic signature of a vehicle crashing into another vehicle, or other sounds common at an accident scene such as a vehicle crashing into an object or hitting a pedestrian (qualifying sounds). Any acoustic data received by the control unit with an acoustic level matching the stored threshold levels will automatically trigger the process of storing accident-related data according to the following parameters. In alternate embodiments, these parameters may be modified according to the requirements of the agency deploying the system.

In alternate embodiments, analysis of video images of motor vehicles moving through the desired location can be used in place of, or to support the use of, acoustic data to detect an accident. For example, unusual movements like sudden deceleration, acceleration or lateral movement of one or more vehicles can indicate an accident condition. As with acoustic signals, models or algorithms can be used to analyze video images for unusual movements, changes in traffic flow or other indications of an accident.

Generally, the control system will include both models of particular types of incidents, as well as a generic algorithm which detects exceptional circumstances which might indicate a traffic incident or imminent traffic incident. This allows optimum control over common or anticipated circumstances, with adaptivity to handle uncommon or new circumstances. It is noted that negative models and algorithms may also be provided; that is, acoustic signatures or characteristics which are known to have low or inverse correlation with a type of traffic incident sought to be detected. For example, it is common to have construction work near intersections with steel plates placed over work-in-progress. The sounds of vehicles passing over these plates may be substantial, yet distinctive. By selectively detecting and filtering these sounds, interference with detection of other sounds, and generation of false alarms, may be avoided.

One embodiment of the invention provides for on-site calibration and tuning of the control system to account for the environment of use and context. This may be especially important for acoustic sensors and processing algorithms, although a corresponding tuning process may be performed with other sensor types. Essentially, the tuning process may include, for example, four different types of standardized acoustic pattern excitation. A first type includes impulse noise, such as an explosion or rapid release of gas, typically useful for a time-domain analysis of the acoustic environment. A second type includes natural sounds, generally corresponding to the embedded models, which can be generated by acoustic transducers or mechanical and generally destructive means, e.g., breaking glass. A third type includes constant or slowly varying frequency emissions, generally from an electronic transducer, horn or whistle, useful for a frequency domain analysis of the acoustic environment. A fourth type includes a pseudorandom noise generator, similar to pink noise, generally available only from an electronic source, to analyze operation in hybrid time-frequency domain. Advantageously, the second (except for destructively generated emissions), third and fourth types of test equipment may be integrated into a single unit, capable of producing arbitrary acoustic waveforms. The first type has as its principal advantage the ability to efficiently produce high intensity emissions, and therefore will not generally be an electronically produced emission. By providing an as-implemented active tuning of the system, it is possible to shorten the training time for adaptive features of the control, while simplifying the algorithms, as compared to a control system which is deployed without any specific tuning process. Likewise, updating of the algorithms and acoustic signatures is also simplified, since the tuning data may be maintained separate and therefore applied to an updated model.

In order to reduce the burden on the agency deploying the system, it is preferred that the control unit be deployed in a generic manner and then autotune itself for acoustic conditions at the desired location. For example, as a part of the installation process, various sounds may be simulated or generated, allowing the control unit to calibrate itself under known conditions. For example, an audio transducer may be placed at an appropriate location to generate acoustic patterns associated with various traffic incidents. A technician may intentionally break a test piece of glass, or otherwise generate actual sounds of a character expected during a traffic incident. Impulse noises, such as a small explosion, gunshot (preferably a blank), balloon pop, or other intense and short sounds may be generated to help map the acoustic environment. Likewise, extended sample sounds, such as air or steam horns, acoustic transducers generating single frequencies, multiple frequencies, white noise, etc., may also be used to map the acoustic environment. During a period after initial installation, the system may be remotely monitored, e.g., continuously, to analyze ambient sounds and ensure that the various sensors are operating and the thresholds are set appropriately.

It is therefore an aspect of one embodiment of the invention that a customized sensor system is obtained through installation of a relatively standard set of hardware, with a minimum of on-site work. It is a further aspect of one embodiment of the invention that an installation (and optionally maintenance) procedure is performed including an analysis of the acoustic environment and context, to ensure adequate system operation with standardized hardware and software, and to permit optimization on-site.

In the preferred embodiment, the control unit is continually storing in the buffer (RAM or data storage means), all audio signals and video images of the desired location in a circular buffer or loop that goes on for a specified period of time, overwriting audio and video that exceeds the specified period of time. When a qualifying sound is detected, the control unit stops overwriting and saves the stored audio signals and video images leading up to the qualifying sound. The time and location data at the time of detection of the qualifying sound are recorded if desired, and if the control unit is connected to a traffic signal control unit, the state of the traffic control signals at the time of detection of the qualifying sound can also be recorded. Subsequent to the qualifying sounds, the control unit continues saving audio signals and video images until the accident is reported, the accident-related data is transferred to a remote location and the control unit is reset. If desired, the saving of audio and video data can be stopped after a predetermined amount of recording time passes, or upon command by the operator from a remote location. In this embodiment, the system is not dependent on preliminary sounds, and is designed to capture the events leading up to an accident. This can be particularly useful in determining the events leading up to the accident, the cause of the accident, assessing fault and determining liability.

In an alternate embodiment, both preliminary sounds and qualifying sounds are utilized, making it unnecessary to continually record audio signals and video data prior to the occurrence of a preliminary sound, as the recording starts upon either of detecting a preliminary or qualifying sound.

In such alternate embodiments, when the control unit detects a preliminary sound like the sound of skidding tires, the control unit begins storing all subsequent audio data and video images. At this point, the time and location data at the time of detection can be recorded if desired, and if the control unit is connected to a traffic signal control unit, the state of the traffic control signals at the time of detection of the preliminary sound can also be recorded. Activating the recording process based on preliminary sounds enables the recording of audio data and video images of an accident to start in the moments before the accident occurs and does not require the storing of audio and video data prior to a preliminary or qualifying sound. If a preliminary sound triggers recording, the location, time and state of the traffic signal can be recorded again upon the detection of a qualifying sound.

If a pre-determined amount of time elapses after a preliminary sound and no qualifying sound is detected, meaning that a potential accident did not occur, the control unit stops recording audio data and video images, the recorded data is cleared from the system, and the control unit resumes its normal operation monitoring for preliminary or qualifying sounds.

Regardless of the embodiment, when the control unit detects a qualifying sound, meaning that an accident is occurring, storing of audio data and video images continues for a predetermined length of time (or starts immediately if there was no preceding preliminary sound in alternate embodiments that utilize preliminary sounds), location and time data are recorded by the control unit, and if connected to a traffic signal control unit the state of the traffic control signals at the time of detection of the qualifying sound is also recorded.

There are sometimes instances when an accident can occur without any advance warning including the absence of preliminary sounds. In the preferred embodiment, the audio signals and video images leading up to the qualifying should have been saved regardless of the circumstances leading up to the qualifying sounds. In alternate embodiments that utilize preliminary sounds, if a qualifying sound is detected without any preceding preliminary sounds, such as an accident where neither driver has the opportunity to apply the breaks prior to impact, the entire process described above, including the storing of audio data and video images, begins immediately upon detection of the qualifying sound.

Regardless of the embodiment, when a qualifying sound is detected, the wireless transceiver begins to initiate contact with the designated remote location ("the monitoring center"). The control unit will continue attempting to establish contact with the monitoring center until contact is established. The system may provide a time-out which ceases communications attempts after a predetermined amount of time lapses, to avoid undue communication system burden in the event of a failure. If communication is not immediately established, there are a number of options available. To the extent possible, the remote unit may store data internally until communications are established. The remote unit may also employ a redundant or backup communications link, for example an alternate cellular carrier, ad hoc network, satellite communications, or other secondary communications system. In the event that the impairment is not with the communications channel, but with the monitoring center, the data may be sent to an alternate or backup monitoring center.

The monitoring center can be an alarm company that monitors commercial and residential alarm systems, many of which have been around for years, a vehicle monitoring service many of which have started operations in the recent years since auto manufacturers have started equipping vehicles with GPS receivers, a monitoring center established specifically for the purpose of the monitoring roadways equipped with the instant invention, or the dispatch center for local fire, police and emergency. Typically, at these facilities, an operator at a workstation will see images of the accident scene and location data on a video monitor. Prompts can be provided to instruct the operator steps to take when an accident is reported, including giving the contact information for the emergency response agency in that location. Such systems for operating a monitoring center as described are well known in the art and need not be discussed further here.

Known and existing systems and services may readily lend themselves for use with the instant invention, provide a more economical solution for the agency deploying the system, and can use excess capacity and provide additional revenue opportunities for the operators of these services, although it may be desirable to provide operators as such facilities with specialized training. However, there are instances where establishing an independent service or integrating the service into existing dispatching facilities of the local authorities might be the preferred solution.

In the preferred embodiment, when the transceiver has established a connection with the remote location ("the Monitoring Center"), the control unit initially transmits the location and at least one still image or live video image of the accident scene from at least one of the video cameras. The determination of whether to use a single or multiple still or moving images at this step is preprogrammed into the control unit according to predetermined settings as desired by the agency deploying the system. Other accident-related data can also be sent with the initial contact, also depending on pre-programmed preferences. The amount and type of data transmitted upon initial contact will be determined in part by the communication means being used, the connection speed and available bandwidth, but the object of the invention is to quickly and efficiently notify the monitoring center of the location of the accident and provide the operator with at least one still or moving image of the accident scene to allow the operator to access the accident scene.

The location data and video images of the accident scene being transmitted from the control unit are displayed on a video monitor at the monitoring center where a person ("the operator") can assess the location and severity of the accident, notify the proper authorities, and provide useful information to help the authorities determine and dispatch the appropriate level of emergency response. If the monitoring center is being operated by the local authorities, the emergency response can be dispatched directly by the operator After the authorities have been notified, the operator at the remote monitoring center can initiate a transfer of the accident-related data stored at the control unit to permanent storage at the monitoring center or other designated facility, or this process can be programmed to take place automatically without operator intervention thereby minimizing the risk of losing accident-related data due to human error. The transmission of stored accident-related data can also start and continue to take place while recording continues and the authorities are being notified.

Error checking methods known in the art or to be developed can be utilized to make certain that the accident-related data is correctly and completely transmitted and stored in a permanent record at the monitoring center or desired location. Such error checking methods are well known in the art and need not be discussed further here.

When the accident-related data has been successfully stored in a permanent record, the control unit may be programmed to unprotect the persistent data storage system, allowing subsequent events to be stored. If the connection with the central monitoring center is kept open, this may be closed, and the system may resume normal operating status, waiting for the next preliminary or qualifying sound to occur. This process can occur automatically, or can require a deliberate signal be sent from the monitoring center.

Typically, it is preferred that the location monitoring units be relatively autonomous, as well as fail safe, and therefore preferably do not require significant handshaking or dense communications in order to maintain normal operating conditions. Therefore, it is preferred that the location monitoring units continuously operate to track conditions or events at the location, regardless of operational conditions at the central monitoring center, and regardless of any communications impairments which might occur.

Once the accident-related data is received from the control unit and saved to a permanent record, this permanent record can then be made available to the authorities for use in determining the cause and fault for the accident, and can be used by the courts, insurance companies and the victims in determining and settling fault and liability.

It is therefore an object of the invention to provide an automobile accident detection, reporting and recording system that uses sound, or other non-visual cues, to determine if a vehicular accident has occurred, or is about to occur, and if so, to maintain a record of accident-related sounds and images, together with other data such as time, location and state of the traffic signals, for a period of time prior to or at the time the accident is detected, and for a period of time thereafter. The record is then reported to a central repository, both for archival storage and to enable a person at such facility to assess the severity of the accident and dispatch an appropriate response. It is noted that the emergency control response center need not be the same as, or related to, the archival storage center, and indeed these can be independently owned, controlled, and operated. Likewise, the economic models underlying these functions can be independent. In fact, it would be reasonable for those at fault in an accident to be assessed a fee for the emergency response expenses, as well as to pay for fees for using the monitoring system and infrastructure. This could be considered a tax, fine, or user fee.

It is a further object of the invention to provide a system for monitoring a location, comprising, an audio transducer for detecting acoustic waves at the location, and having an audio output; a processor for determining a likely occurrence of a vehicular incident, based at least upon the audio output; an imaging system for capturing video images of the location, and having an image output; a buffer, receiving the image output, and storing a portion of the video images for a preceding period, including at least a period immediately prior to the determination of a likely occurrence of the vehicular incident up to a time of the determination; and a communication link, for selectively communicating the portion of the video images stored in the buffer, wherein the buffer retains the portion of the video images, at least until an acknowledgement of receipt is received representing successful transmission through the communication link, and after receipt of the acknowledgement, a portion of the buffer containing the portion of the video images is available for reuse.

It is also an object of the present invention to provide a modular intelligent transportation system, comprising an environmentally protected enclosure, suitable for protecting electronic equipment from uncontrolled weather conditions when placed outdoors, the enclosure being installed at a location, a bus, providing a communications interface between at least two devices connected to the bus, a port for at least one of receiving a signal indicating a state of a traffic signal, and producing a signal for controlling a state of a traffic signal, a processor module and memory, communicating with the bus, having at least one of an audio data input, and an image data input, the processor module analyzing data patterns represented in at least one of the audio input and image data input and audio input, and the memory at least temporarily storing at least a portion of the data, at least one option port, providing an available location for hardware and physical access to the bus, wherein the processor module has sufficient additional processing capacity to undertake additional processing tasks, a power supply, providing power to the processor module and to an option port or device connected to said option port; and a communication link for communicating remotely from the enclosure.

It is a further object of the invention to provide a vehicular monitoring system, comprising an environmentally protected enclosure, suitable for protecting electronic equipment from uncontrolled weather conditions when placed outdoors, a power supply, a processor module for receiving data representing vehicular conditions and analyzing the data to determine at least one of a vehicular incident, a likely occurrence of a vehicular incident, or an imminent vehicular incident, and memory to at least temporarily store at least a portion of the data, an interface for communicating with a traffic signal control device, receiving at least a status of the traffic signal, at least one option port, providing a physical interface for communications with the processor module, and a communication link for communicating remotely from the enclosure, wherein the at least one option port permits optional hardware therein to access resources of at least one of the power supply and the processor module.

It is another object of the invention to provide a modular intelligent roadway monitoring system, comprising an enclosure, providing environmental protection to electronic modules contained therein, a communication link for communicating data remotely from the enclosure, a vehicular monitoring system, receiving an image input and communicating information relating to the image input remotely through the communications link, and an interface for communicating with an optional module proximate to the enclosure, and providing logical communications with the vehicular monitoring system and the communication link.

The system may further include a wireless data communication system, for example a cellular communications transceiver, a multihop ad hoc network radio transceiver, or at least one wireless local area network access point, having at least one of a communications path to the communications link and the at least one port. The communication link may provide unidirectional or bidirectional communications remotely from the enclosure. The port may be capable of receiving information relating to local vehicular conditions proximate to the enclosure. The communications link may be a packet switched network, for example, the Internet or other TCP/IP network. The communication link may include a primary link and a backup link, using a different physical transport layer, the communication preferentially occurring through the primary link, and in an event of failure of the communication through the primary link, then through the backup link, wherein a physical transport layer of the primary link and the backup link are each selected from one or more of the group consisting of public switched telephone network, coaxial cable, twisted pair, cellular communications, satellite-based communication system, point-to-point radio frequency wireless, point-to-point microwave wireless, broadcast wireless, line-of-sight optical, fiber optic, and ad hoc radio network. Data identifying the location may also be communicated over the communications link. The various communications systems may intercommunicate and relay messages through each other. Therefore, a wireless local area network access point may provide Internet access around the system enclosure through the communication link, which is also used for core system functions. This same access point may be used to communicate with various sensors, such as camera and microphones, and with a traffic signal control device.

The processor module may execute an operating system having an application programming interface such that hardware placed in the option port can communicate with the processor module and interact with the application programming interface. The system may provide forensic reliability for at least one type of data stored by the processor module and communicated through the communication link. The processor module may determine a likely occurrence of a vehicular incident, based at least upon the audio input. The processor module may also persistently store a portion of the image data for a period preceding a determination, wherein the portion of the image data may be preserved at least until an acknowledgement of receipt is received representing successful transmission through the communication link. The processor module may determine the likely incidence of a vehicle incident at the location based on occurrence of at least one of a set of predetermined accident-related acoustic signatures represented in the audio input. The processor module may analyze a motion vector of at least one vehicle at the location to determine the likely occurrence of a vehicular incident and/or correlate a pattern of the motion vector with an acoustic information pattern to determine the likely occurrence of a vehicular incident. Another possible function of the processor is to determine whether a vehicle fails to comply with an applicable traffic signal, traffic sign, law, rule, or regulation. The processor may also predict and/or detect various types of vehicle incidents.

The system may include a satellite-based geolocation system, or a terrestrial based geolocation system for determining a geographic location of the system. The system may also contain a self-contained power source, which may be a rechargeable battery system primary battery system, solar or wind power system, internal combustion engine with generator, or the like. The system preferably includes a camera for inputting image information and/or a microphone for inputting acoustic information relating to vehicular conditions.

The system architecture may include a remote monitoring center at the remote location, communicating with the system through the communication link, the remote monitoring center receiving communications from a plurality of communications links at respectively different locations. A record communicated through the communications link, preferably one that may be forensically authenticated through a manual or automated process, providing at least one of physical security and cryptographic security, to ensure that the forensic record is a reliable record of events recorded by the system. Although a forensic record is preferred, the record can be communicated normally, without any forensic or security protocol.

The system may include an interface to a traffic signal control device, although a camera may also be used for the purpose of determining the status of any traffic signals at the location. The system may also include a power supply for providing power to the vehicular monitoring system and an optional module, which for example is contained within the same housing as the system processor. The optional module may interface with a communications bus through either a modular connector or a wireless connection. The optional module may also be located outside the housing, the optional module and the system processor communicating through a data communications network, wherein communications between the optional module and an external system are conveyed through the vehicular monitoring system.

The communication link may comprise a wireless transceiver, which generally simplifies installation. Alternately, the communications physical transport layer can include coaxial cable, twisted pair, cellular communications, point-to-point radio frequency wireless, point-to-point microwave wireless, line-of-sight optical, fiber optic, and ad hoc radio frequency network. According to one embodiment, the communication link comprises a primary link and a backup link, using a different physical transport layer, the selective communication preferentially occurring through the primary link, and in an event of failure of the selective communication through the primary link, then through the backup link. The backup link, in this case, may employ a more expensive communications method. This, in turn, allows selection of a less expensive physical transport layer for the primary link, even if the reliability of this is less than required.

The system may further comprise a location sensor, for determining a geographic position of the location, the geographic position being communicated through the communications link. The location sensor is, for example, a GPS receiver, receiving signals from a plurality of communication satellites and determining a geographic position of the location and a time, the geographic position and time being communicated through the communications link. Therefore, for example, the communication link is wireless, and the system communicates information defining its location to a remote system. The location information is useful since a plurality of systems may employ a common wireless communications band, and thus cannot be distinguished based on a physical communications channel employed.

The buffer may receive at least one of the audio output and video output, and store a portion of the audio output representing the acoustic waves and video output representing video images for a preceding period, including at least a period immediately prior to the determination of a likely occurrence of the vehicular incident up to a time of the determination, wherein the communication link selectively communicates the portion of the audio output stored in the buffer. The communication link may also communicate a stream of video images captured after the determination. The audio transducer comprises, for example, one or more microphones.

The processor may formulate its determination based on occurrence of at least one of a set of predetermined accident-related acoustic signatures represented in the audio output. The processor may determine a likely imminence of a vehicular incident, based at least upon the output of the audio transducer and the immediately preceding period extends between a determination of a likely imminence of a vehicular incident and a likely occurrence of a vehicular incident. Alternately or in addition, the processor may analyze the image output to determine a likely imminence and/or occurrence of a vehicular incident.

The system may also include a self-contained power source to operate the system in the event of a power failure.

The communication link typically communicates with a remote monitoring center, the remote monitoring center generating the acknowledgement of receipt. The communications link may also communicate with mobile transceivers, for example to supply information to a vehicle regarding conditions at the location. Thus, the system may form part of a real-time telematics system to provide traffic information to vehicles on demand. The remote monitoring center may issue control signals to the system through the communications link, thus allowing remote control of the system, for example, even when no incident is detected.

The imaging system may comprise a plurality of video cameras directed at various portions of a location near an electrical traffic signal, wherein a first video camera is activated for a predetermined time period and each subsequent video camera is activated upon deactivation of an active video camera such that only one the video camera is activated at a given time. This configuration permits the system to operate with a limited set of resources, for example a single multiplexed video input. The imaging system may also comprise a plurality of video cameras directed at various portions of a location, in which the processor produces a combined output representing a synthetic representation of the location. A synthetic representation is typically more useful for real time streaming of data to provide high compression ratios of data representing a single set of objects from multiple sensors, rather than forensic evidence, since the synthesis may be prone to certain types of errors. The communication link may be operative to activate the system to communicate video images based on a remote request.

The system may also include a traffic control device status sensor, the traffic control device status being communicated by the communication link.

It is a further object of the invention to provide a system for determining and reporting the occurrence of a vehicle incident at a scene comprising a sensor for detecting conditions at the scene; means for predicting the likely occurrence of a vehicle incident at the scene, based on a comparison of detected conditions from the sensor and a set of predetermined incident signatures, the means for predicting producing an output prior to or contemporaneous with the vehicle incident; a memory for storing conditions at the scene detected by the sensor; and a communications system for selectively communicating the stored conditions to a remote monitoring center after predicting a likely occurrence of an incident, including conditions detected preceding the likely occurrence of a vehicle incident.

The sensor may comprise one or more microphones and/or video cameras adapted to capture incident-related audio or video signals at the scene. Further, sensors may also include radar transceivers, and LIDAR transceivers.

The memory may comprise a circular buffer, wherein contents of the circular buffer are preserved after a prediction of a likely occurrence of an incident until an acknowledgement is received that the contents has been communicated to a remote location.

The system may also comprise a location sensor, for determining a location of the scene, the location being communicated through the communication system.

In accordance with an embodiment of the invention, the system may have a low resource mode and a high resource mode, the low resource mode being active prior to a prediction of a likely occurrence of an incident, the high resource mode being active subsequent to a prediction of a likely occurrence of an incident until reset, wherein the system has a limited capability for maintaining the high resource mode. For example, the resource limitation may be availability of power or memory capacity.

It is a still further object of the invention to provide a method comprising the steps of capturing vehicle incident-related signals at a scene; determining if a vehicle incident has occurred at the scene; capturing incident-related data preceding and during the occurrence of the determined vehicle incident; transmitting the captured incident-related data; and protecting the incident-related data until an acknowledgement is received indicating successful receipt of the incident-related data by a remote system, then unprotecting the incident-related data, wherein protected incident-related data is selectively preserved. The determining step may comprise analyzing an audio signal for acoustic emissions which have a high correlation with an incident, and/or analyzing a video signal to determine object states and vectors which have a high correlation with an incident. A compressed digital signal may be transmitted representing a composite of a plurality of sensor signals representing conditions at the scene. A stream of real time video data representing conditions at the scene may also be transmitted.

In accordance with these and other objects which will become apparent hereinafter, the instant invention will now be described in its preferred embodiment with particular reference to the accompanying drawings.

DESCRIPTION OF THE PREFERRED EMBODIMENTS

Figure 1:
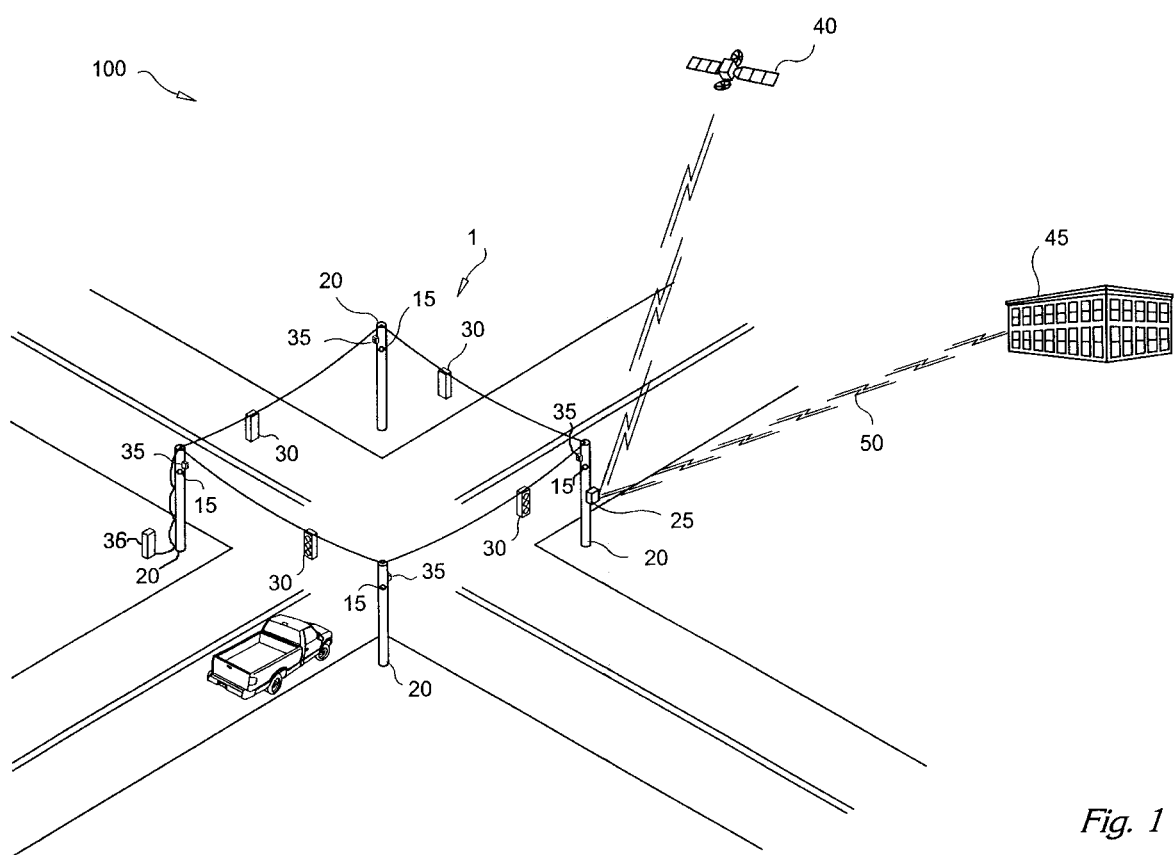
FIG. 1 is a perspective view of a typical traffic intersection scene including a preferred embodiment of the automobile accident detection and data recordation system of the present invention.
Figure 2:
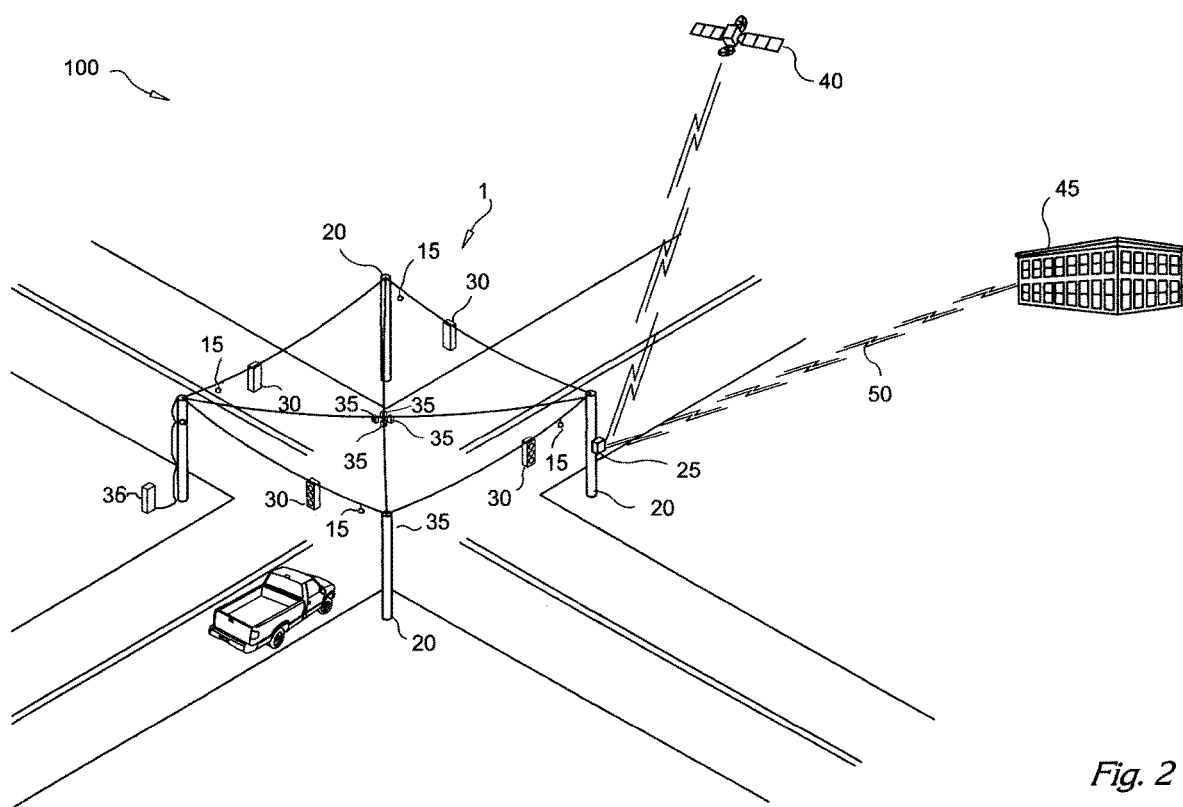
FIG. 2 is a perspective view of a typical traffic intersection scene including an alternate embodiment of the automobile accident detection and data recordation system of the present invention.

As seen in FIG. 1 the present invention is illustrated and generally designated as the system 100. The system 100 comprises one or more listening devices 15 placed proximate a traffic scene 1 which is referred to as the desired location. The desired location 1 can be any street, a section of highway, an intersection, or any other place where a traffic accident can occur. Listening devices 15, preferably microphones, are be mounted strategically at one or more positions proximate the desired location 1. In FIG. 1, the microphones 15 are place on utility poles 20, but they can be placed on any object proximate the desired location 1 such as underneath the traffic signals 30, suspended on wires above the intersection as shown in FIG. 2, or on other structures such as buildings so long as they are placed to allow accurate capture of the acoustic signals at the desired location 1.

The microphones 15 are connected to the MITS, also referred to as the control unit 25 either by wired or wireless means, and the control unit 25 receives the acoustic signals from the microphones 15 and converts them to a data format that can be compared to the acoustic signatures of accident-related sounds. These accident-related sound signatures can include the sound of skidding or screeching tires (preliminary sounds) or the sound of a vehicle impacting another vehicle, structure or pedestrian (qualifying sounds), all of which indicate an accident is about to occur or is occurring. Further, the acoustic signals received from the microphones 15 can be filtered to remove sounds which are generally non-indicative of traffic incidents or accidents. This further ensures that the control unit 25 will detect and react only to sounds that have a high probability of being accident-related sounds.

It is also possible to use a passive (non-electronic) acoustic pickup device. For example, a laser beam incident on a diaphragm will be modulated by the acoustic vibrations present. Likewise, passive radio frequency devices (e.g., backscatter emitting) devices may be sensitive to acoustic waves. Therefore, the control unit 25 may emit energy which is modulated by the acoustic waves in the environment, which is then detected and used to determine the audio patterns.

In this preferred embodiment the control unit 25 needs only to react to audio signals determined to be qualifying sounds, such as the sounds of an actual impact of a vehicle with another vehicle, object or pedestrian, because data is continually saved in a circular buffer, and upon occurrence of a qualifying sound the buffer temporarily stops overwriting old data, or transfers the data from a temporary buffer to persistent storage, thereby preserving a record of the accident. This preferred embodiment can, but does not need to, respond to preliminary sounds.

In alternate embodiments, the system also reacts to audio signals determined to be preliminary sounds indicating an accident is about to occur such as the skidding of automobile tires, and starts recording data when it detects either a preliminary or qualifying sound. This alternate embodiment can, but does not necessitate, the use of a circular buffer.

The circuitry for determining whether the received acoustic signals are qualifying sounds (or preliminary sounds in alternate embodiments) is housed within the control unit 25 which also houses some other components of the system 100. FIG. 1 shows control unit 25 mounted on a utility pole 20 although the control unit 25 can be situated upon any structure proximate the desired location.

Typically, this circuitry will include a digital signal processor, although a microprocessor may be programmed to perform digital signal processing with its general-purpose computing resources.

To accurately capture images related to the accident, it is necessary to place one or more image capturing devices, preferably video cameras 35, at such positions that they can capture video images of the desired location 1. The video cameras 35 can also be used to determine the status of traffic signals 30, and if so desired one or more video cameras 35 may be directed at the traffic signals 30. Ideally, the view angle of the video cameras is sufficiently wide to display both the street area of the desired location 1 and the visible portion(s) of the traffic signal(s) 30 from that angle, however, a separate video camera or cameras 35 or other suitable devices can be used exclusively to monitor the state of the traffic signals at the desired location 1. Alternatively, the control unit 25 can be connected to the traffic signal control device 36 in place of or in addition to the use of video cameras 35 for this purpose.

The video cameras 35 are positioned proximate the desired location 1, preferably on utility poles 20 as shown in FIG. 1, or on other structures at or near the desired location. In one configuration, the cameras are suspended above the center of an intersection as shown in FIG. 2. It is preferred, as shown in both FIGS. 1 and 2, that four cameras be situated such that images of all possible areas near the desired location 1 are captured, and each camera 35 is electrically or wirelessly connected to control unit 25 using means similar to the means used to connect the microphones to the control unit 25. However, it may be desirable to use more or less than four cameras 35. For example, one camera 35 may be mounted in a location such as a building with a view that covers the entirety of the desired location 1 and at least one of the traffic signals 30.

In the preferred embodiment, the video cameras 35 are always activated and always sending video images to the control unit 25. The control unit 25 continually saves audio signals and video images to a circular buffer in a loop for a predetermined period of time, overwriting audio and video data that falls outside this predetermined time range. This scheme therefore allows persistent storage of prior events, while minimizing memory usage and preserving privacy of persons near the incident at times when there is no incident.

In alternate embodiments, storing of audio signals and video images is triggered only by the detection of a preliminary sound or by a qualifying sound if there has been no preceding preliminary sound.

In yet another alternate embodiment the cameras 35 are in the off or stand-by condition, and when a preliminary or qualifying sound is detected at the desired location 1, the control unit 25 sends a signal to each camera 35, activating them so recording of images can begin. In other alternate embodiments, a series of cameras 35 may be programmed for each to be active for a predetermined length of time, so that images from at least one video camera 35 is always available for capture should an accident occur. The cameras 35 may be associated with motion detectors, or themselves be used as motion detectors, to trigger video transmission and recording. For example, a first camera 35 may be operating from time $T_1$ until time $T_2$, at which time it shuts off. Just prior to $T_2$, a second camera 35 is activated and begins recording images at the scene until time $T_3$. Just prior to time $T_3$ a third camera 35 begins operating. This sequence can continue for additional cameras 35, reverting back to the first camera 35 again. This allows for continuous monitoring of the desired location 1 by a select number of video cameras 35 while optimizing the cameras' 35 available resources until they are needed. The timing and operation of each camera 35 is controlled from control unit 25. In this alternate embodiment, when the control unit 25 detects a preliminary or qualifying sound, all cameras can become active, but the control unit 25 is able to capture the image from the camera 35 that was active at the time of the qualifying or preliminary sound without any lag time that may occur while the other cameras 35 take time to turn on or activate. Alternatively, one or more specified cameras 35 can be left on all the time, and others activated upon detection of a preliminary or qualifying sound. Discussion of these alternate embodiments, here and throughout this description is not intended to be limiting, and the intent is to illustrate some of the many possible combinations for configuring and customizing the system 100.

By limiting required data flows between the elements based on intelligent analysis of the data or the use of heuristics, greater efficiency is obtained, permitting deployment of a design having lower cost, and causing less interference or intrusion into its environment or context. Thus, while all data may be continuously recorded and transmitted, this is relatively inefficient and intrusive.

Reference is also made to the components in FIGS. 1 and 2. In the preferred embodiment, the control unit 25 continually receives and monitors the incoming acoustic data received from the microphones 15 and analyzes the acoustic data to determine it corresponds to a pattern of a qualifying sound, for example, the sound pattern resulting from a motor vehicle impacting with another motor vehicle, a pedestrian or an object. In one alternate embodiment, when a qualifying sound pattern is detected, the control unit 25 may communicate with other nearby control units, instructing them to also capture and transmit data. This, for example, might allow capture of the path of a hit-and-run accident before and after the accident, video from other angles, and the identity of witnesses (through license plate tracking).

In the preferred embodiment, the video camera(s) 35 are always in an "on" state so the control unit 25 is always receiving the video images, and the control unit 25 is always recording audio signals and video images in a circular buffer or loop that goes on for a predetermined period of time, continually overwriting data that exceeds the predetermined period of time. This and other predetermined periods of time discussed throughout this description, are variables which can be set according to the preferences of the agency deploying the system 100, and indeed, the predetermined period can change in each instance. When a qualifying sound is detected, the control unit 25 persistently stores the audio and video data that was buffered prior to the qualifying sound, and begins a sequence of events as described below.

In alternate embodiments that utilize preliminary sounds, if an incoming sound is recognized to be a preliminary sound, then protected storage of the audio signals and video images begins and the control unit 25 continues to monitor incoming audio signals until the earlier of a predetermined period of time elapses or an incoming audio signal is recognized to be a qualifying sound.

If before the passing of a predetermined time, an incoming sound is recognized to be a qualifying sound, meaning a determination that an accident is occurring, then recording of audio and video signals continues and a number of other events are triggered as described below.

If a preliminary sound has been detected and the predetermined time passes without the detection of a qualifying sound, meaning that an accident-related sound has not been detected, the recording ends, the stored data is cleared, and the control unit 25 returns to "listening mode" to wait for the next preliminary or qualifying sound.

If an incoming sound is initially recognized to be a qualifying sound, then the storage of audio and video signals begins immediately as it does with the detection of a preliminary sound, and the control unit 25 proceeds with the other steps described below in the same manner as when a qualifying sound follows a preliminary sound.

It is noted that the hardware which is part of the control unit 25 may be used for other purposes, such as traffic violation monitoring (compliance with traffic control devices, speed control, etc.).

Returning to a consideration of the preferred embodiment, when the control unit 25 detects a qualifying sound that indicates an accident is occurring, the control unit 25 initiates the following series of events:

The circular buffer temporarily stops overwriting data, and video data recorded prior to the qualifying sound, and audio data if desired, is saved and will no longer be overwritten or erased, and all ensuing video images, and audio signals if desired, are also stored within a storage device which can be RAM memory, a hard drive, magnetic or optical tape, recordable CD, recordable DVD, flash memory or other electronic storage media. The storage device can be located within the control unit 25, or in some alternate embodiments can be a separate device connected to the control unit 25 by wired or wireless means. The recording of audio and video signals continues for a predetermined length of time. Therefore, the control unit 25 captures events leading up to, during and after the accident or event occurs.

In addition to recording of video and audio data, a qualifying sound also triggers the following events:

In the preferred embodiment, a satellite navigation system receiver such as the Navstar GPS 40, is the preferred means used to determine the time and location. The time and location may also be determined using other types of satellite-based geolocation, such as differential global positioning system device (DGPS), GLONASS, Galileo, Argos, and Cospas-Sarsat, or a terrestrial network-based positioning device, such as LORAN, cellular network geolocation, or other types of systems, which may employ one or more of angle of arrival and/or antenna spatial radiation patterns, time difference of arrival, signal path propagation patterns, and the like. Alternatively, a location identifier can be maintained in the control unit 25. Time may also be maintained internally within the control unit or determined at the remote monitoring center 45. For example, the location of the control unit 25 may also be programmed or hard-coded into the control unit 25, or a location identifier may be programmed into the control unit 25 to be transmitted to the monitoring center 45 where the location can be looked up in a database. While use of pre-programmed location or location identifier is functional, it is not the preferred means for identifying location because it is prone to human error and adds to the complexity of deployment, unlike the geolocation means discussed above. In the preferred embodiment, a GPS receiver preferably located within control unit 25 constantly receives signals from GPS satellites 40. Upon the detection of a qualifying sound, the time of detection of the qualifying sound is determined. While the location is also available from the GPS receiver, a stationary control unit will typically not need to acquire location information for each event, there is little cost in doing so. The GPS data (including, for example a full timecode which specifies time and date, as well as location) is therefore recorded, stored and transmitted to the remote monitoring center 45 along with the video data and optional audio and traffic signal data. Although in some alternate embodiments, the control unit 25 can continue to record the time at specified intervals and for a predetermined period of time, in the preferred embodiment the location and time are recorded at least at the time when a qualifying sound is detected, and either may be recorded with each image, and if desired and present upon each change in the state of a traffic control signal(s) 30. In alternate embodiments that use preliminary sounds, the time of the detection of a preliminary sound can also be recorded.

Using the elements described above, a data file or multiple data files containing accident-related information such as audio signals, video images and GPS time and positioning data, and data on the state of any traffic signal present at the desired location 1 proximate to the time an incident is detected, is created and stored in memory or other means as described above. It should be noted that the agency deploying the system 100 can select to capture and transmit part or all of the available accident-related data according to its preferences, but that generally, at a minimum, the system needs capture and transmit video and location data in order to be useful for its intended purpose.

While, in theory, the accident-related information could also be stored locally, this information has potential forensic value, and this local storage might necessitate impounding of the control unit 25 as evidence, leading to substantial inefficiencies. On the other hand, if the accident-related data is reliably and securely communicated to a remote site and flushed from the control unit 25 as a matter of course, then it is less likely that a forensic analysis will require more than an inspection of the control unit 25, while avoiding impairment of the data.

Once commenced, the recording and storing of all accident-related data continues for a pre-determined length of time, until memory/storage capacity is reached, or until the data is communicated to a central monitoring system (and preferably acknowledgement received). For example, the recording process can continue for a minute, several minutes or fifteen minutes or more, and can be programmed or adjusted remotely from the monitoring center 45 if there is a need to shorten or extend the time of recording.

Returning back to the preferred embodiment, upon the detection of a qualifying sound indicating that an accident is occurring, the control unit 25 starts to initiate contact with the designated monitoring center 45 over the communication link 50. The monitoring center 45 can be operated by the authorities or agency deploying the system, can be a special facility dedicated exclusively to monitoring traffic accidents or incidents, equipped with the present invention, or, alternatively, can be a standard monitoring center used to monitor incoming alarm calls or transmissions from vehicle navigation systems.

The preferred means of communication link 50 is a wireless system, and any of a number of traditional wireless communication technologies can be utilized such as cellular, PCS, CDPD (Cellular Digital Package Data), 2.5G cellular, 3G cellular, or a data transmission technology developed for use on cellular phone frequencies; however, contact can be established by standard or wireless telephone line or network connection as well.

Upon making contact with the monitoring center 45, the control unit 25 initially transmits the location information of the desired location 1 which may be displayed on a computerized map at the monitoring center 45. In the preferred embodiment, simultaneously or shortly before or after the location data is transmitted, at least a still or live image of the desired location 1 showing the accident scene is transmitted to the monitoring center 45 and at least the location of the accident is displayed, preferably on an electronic map together with at least one image of the desired location 1 so the operator at the monitoring center 45 can evaluate the accident scene to determine the appropriate level of response. Alternatively, a series of images can be transmitted at predetermined intervals, or real-time live video can be utilized. A still image can be used when bandwidth is limited, and a series of still images or a live image can be used when sufficient bandwidth is available. A still image followed by a live image can be also used so that the location and image of the accident can be quickly transmitted for visual assessment by the operator in determining an appropriate response, followed by periodic still or live images to allow the operator to continue to monitor the situation and report to the authorities. If desired, it is possible to transmit still images having higher resolution than that present in the video feed, and allow the operator to select a desired mode.

In some embodiments, the system 100, e.g., the various control units 25, may communicate with, or be integrated with, a "concierge" type telematics system, such as is operated by OnStar or ATX. Therefore, it is also possible to fuse the data from vehicles involved in an accident or incident with that from a fixed infrastructure. Likewise, it is possible to use vehicular sensors as a part of the monitoring system, in which case the GPS location data becomes a critical part of the data record. Currently, some vehicle navigation systems trigger an emergency call when the airbags are deployed. As in-car telematics systems evolve, the occurrence of an airbag deployment (or other indication of an accident) on a vehicle may be used to trigger a signal to activate recording at any control units 25 within the proximity of the signal, and this may become a feature in some of these telematics systems which can be employed by the present invention to further enhance the functionality of the system 100.

The initial data transmission can also include the telephone number of the emergency response authority for that particular scene. In this event, the number is stored in memory within control unit 25 and corresponds to the emergency dispatch unit closest to scene 1 as directed by local authorities. The number of the emergency response agency can also be stored at the monitoring center and displayed at the remote monitoring center 45 based on the location of the accident.

After the operator at the monitoring center 45 has contacted the appropriate authorities and dispatched the appropriate response, the operator can instruct the system to initiate an upload of the at least a portion of the stored accident-related data onto a server or other data storage device for archiving, and for later distribution to interested parties such as the authorities, accident victims and their insurance companies. This uploading process can also be automated so no operator intervention is required, and can also be dynamic so that it takes place while the operator is contacting the emergency response agency. The data can be archived in a sufficiently reliable form for use in court or other proceeding as necessary. For example, the data may be watermarked and/or associated with a hash, or a digital signature to assure that the data is not altered and is complete. With reliable capture and subsequent availability of audio and video evidence provided by the present invention, contests over liability from traffic accidents and the associated burden on the legal system and insurance companies may be substantially reduced.

In the preferred embodiment, video and audio compression techniques are generally used to compress the recorded data in order to transmit greater amounts of information in less time using less bandwidth. For example, the data may be transmitted using one of the ITU multimedia communication standards, such as h.324M, h.263, or the like. Other suitable formats include MPEG4, AVI, WMV, ASX, DIVX, MOV(QT), etc. However, uncompressed data may also be transmitted.

In motion vector-based video compression formats, the motion vectors may advantageously also be used for video analysis. In particular, one characteristic of an accident is that one vehicle transfers its momentum to another. Therefore, by analyzing motion vectors for rapid acceleration of objects, i.e., >2 g, one may infer that this acceleration is due to an impact, since the normal adhesion limits of tires are limited to <1.5 g. Advantageously, the motion vectors are computed once for both video analysis and video compression.

Once it is confirmed, either by the operator at the monitoring center 45 or by automated process, that the accident-related data has been successfully transmitted and uploaded, a signal is sent to the control unit 25 to clear the memory and storage and the control unit 25 returns to its standby state to continue monitoring the desired location 1 for another indication of an accident. This signal can be sent automatically when the system determines the transmission and receipt of the accident-related data was successful, can require the operator to confirm successful transmission and receipt, and to initiate sending of the signal manually, or can take place within the control unit 25 when the control unit 25 determines the transmission and receipt of the accident-related data was successful. Either way, the system 100 is programmed so the accident-related data cannot be deleted until it is successfully transmitted to, and receipt of the data confirmed by, the data storage facility at the monitoring center 45 or other location. Once this signal is sent and received by the control unit 25, the control unit 25 resumes monitoring the desired location 1 to wait for the next qualifying sound (or preliminary and qualifying sounds in alternate embodiments).

In one embodiment, during the transmission and/or uploading of data, the control unit 25 is capable of detecting further accidents. Microphones 15 are constantly monitoring sounds and comparing the signals to patterns of particular events of interest, or simply compared against stored threshold acoustic levels, to determine if preliminary or qualifying sounds are detected. Should the control unit 25 detect another preliminary or qualifying sound during data transmission, the new accident-related data is stored in a separate file for as long as there is storage capacity to do so, and the monitoring center 45 is notified of the new accident over the communication link 50. Therefore, in this embodiment, a control unit 25 is capable of detecting and recording accident-related data from multiple accidents even during the transmission of prior accident-related data. When the stored data from the first accident has been successfully transmitted and received, the data from the subsequent accidents is then transmitted to the monitoring center 45 in the same manner as was the first accident-related data.

The present invention is not limited to any particular algorithm for the analysis of audio and/or video data, and indeed the processor may be of a general-purpose type, which can employ a number of different algorithms and/or receive updates through the communication link to modify, adapt, update, or replace the algorithm(s). Without limiting the scope of the invention, Bayesian probabilistic processing, Hidden Markov Models, and wavelet-based processing are preferred methods for acoustic analysis to determine a likelihood of occurrence of an event, such as an accident.

It is also noted that there are types of traffic incidents which do not comprise accidents, and indeed may have causation without respective fault or liability. In such instances, the processor may be used to detect and classify these various incident types and report them to the central monitoring center 45. In these instances, the retention of a record of the conditions may be controlled manually by an agent at the central monitoring center 45, or according to an algorithm specific for these types of incidents.

According to another embodiment of the invention, a large volume of raw sensor data is accumulated, either at the location (i.e., the local controller) or the remote location (i.e., the central monitoring center 45), for use in adapting algorithms to achieve optimum detection characteristics. Therefore, according to this embodiment, while the records need not be stored in a manner required for forensic authentication to be used as evidence in a legal proceeding, that is, with high reliability so as to ensure that the record has not been tampered with or altered, there are stored regardless of whether they appear to represent an incident or not (although a thresholding function may be applied to limit the storage or data storage requirement of signals which appear to represent unremarkable events).

In an alternate embodiment, the control unit 25 continues recording at least video images after the first accident until the scene is cleared, and any subsequent accident will be captured in the running video. In this embodiment, the operator at the monitoring station 45 can be given a visual and/or audio cue advising that another accident has occurred, and the time of detection can be recorded for each qualifying sound and if applicable, preliminary sound, thereby giving a time record of any subsequent accident. Alternatively, the time can be recorded continuously, or at specified intervals in running video.

During normal operation, the control unit 25 and other related components are powered via the current-carrying conductors available at most intersections and roadway locations. In an alternate embodiment, a battery backup system takes over during power failures and allows the control unit 25 and other components to operate until electrical distribution to the scene has been restored. In other alternate embodiments, the control unit 25 or components may be powered solely by batteries which are kept charged by solar panels or other means for charging batteries when no electricity is available, for example a wind powered generator. When under battery power or otherwise power constrained, the control unit 25 preferably adopts a power efficient operating mode, for example, minimizing power hungry data capture and data transmission unless triggered by a qualifying or preliminary (preceding) sound pattern. This power efficient operating mode can continue to be used while recording and transmitting accident-related data by minimizing the amount of video captured. One method for accomplishing this is to reduce the resolution of the video being recorded and/or the number of recorded frames either consistently, or at a variable rate. When using a variable rate while waiting for a qualifying sound, the system can record at a reduced frame rate, increase the frame rate temporarily upon detection of a qualifying sound, and return to the reduced frame rate after a predetermined length of time, such predetermined length of time to be determined according to the preferences of the agency deploying the system. The connection over the communication link 50 can also be closed as soon as the initial accident data is transmitted to the monitoring station 45, and then reopened later to transmit the accident-related data. Finally, the recording can be stopped at a predetermined time after a qualifying sound has occurred instead of continuing until being reset as in the preferred embodiment. These methods create a record of the accident-related data that is still reliable, but occupies less storage space and takes less transmission time, resulting in less power consumption.

In the preferred embodiment, the control unit 25 can be programmed remotely from the monitoring center 45 to input identification data, program contact information for the monitoring center 45, adjust recording times and other parameters that are critical to the operation of the control unit 25 and its components, and to perform diagnostics to detect failures and to reset the control unit 25 if necessary. In some embodiments, the operator at the monitoring center 25 can send a command to initiate recording, terminate a recording prior to the predetermined time, or to extend the recording to continue beyond the predetermined time.

In an alternate embodiment, the status of each traffic light 30 (red, green, yellow) is determined by electrically connecting the control means for the traffic signal 36 to the control unit 25 so that when a preliminary or qualifying sound is detected, the control unit can record the state and time of change of each traffic signal 30 at the relevant times, and if desired the time and state of each transition of the traffic signals' status for a specified period of time after detecting the qualifying sound. This data may become part of the accident-related data that is stored and subsequently transmitted to the monitoring station 45.

In variations of the preferred and alternate embodiments, a visual signal can be placed at the desired location to indicate that an incident has been detected at that location, and if desired, when contact is established with the remote monitoring center another signal can be employed to indicate the incident has been reported. The first signal alerts drivers in the area that an incident has been detected at the location, and the second that the incident has been reported, thereby reducing the demand on the resources of the emergency response system that comes from multiple reports of the same incident.

Figure 3:
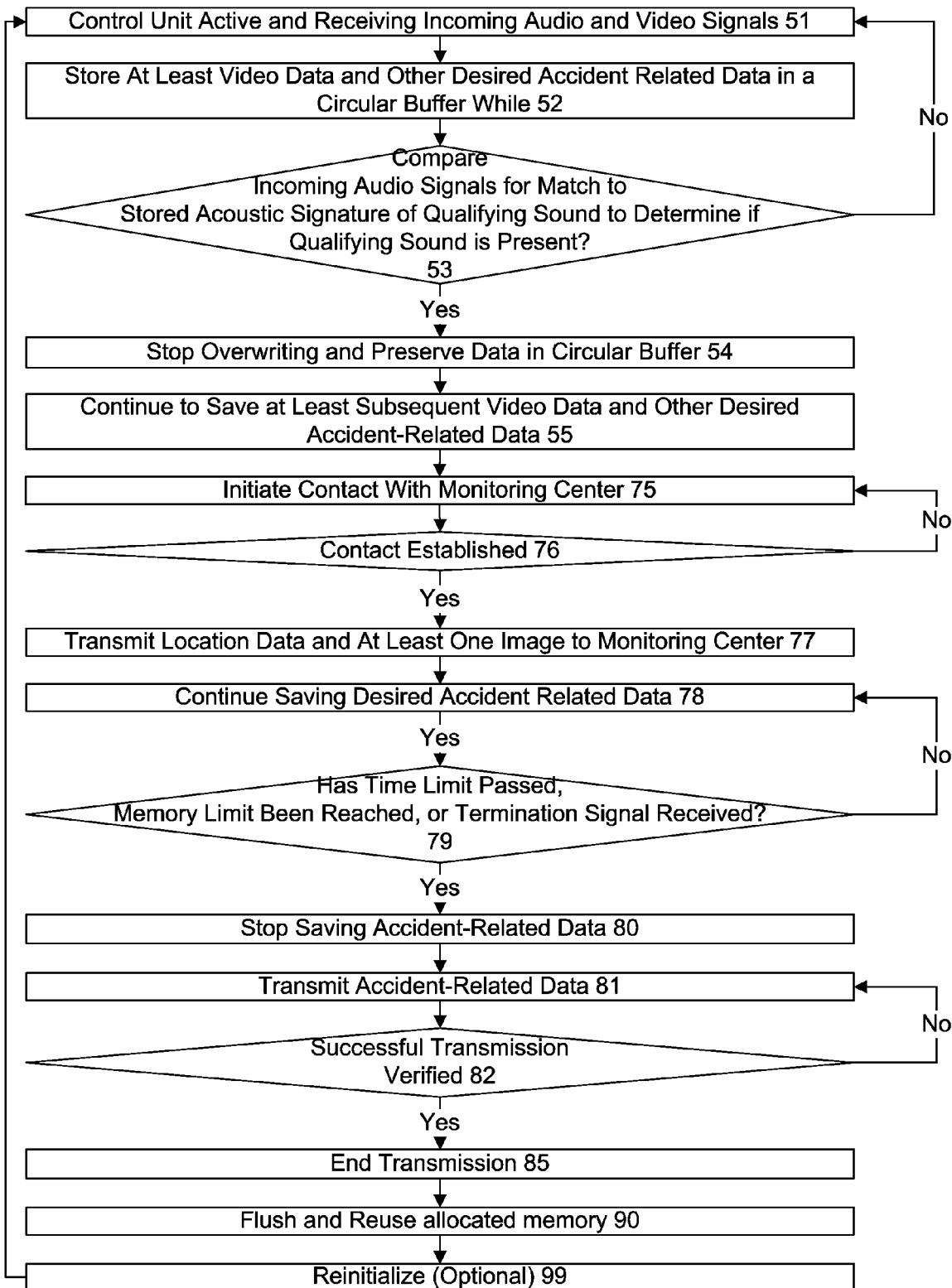
FIG. 3 is a flowchart representing the steps performed by the automobile accident detection, data recordation and reporting system according to a first embodiment of the present invention.

Referring now to FIG. 3, a flowchart is shown illustrating the steps performed by the preferred embodiment of the present invention. In step 51 the control unit 25 is activated and microphones 15 are sending audio signals of sounds from the desired location 1 which are being received by the control unit 25, which is also receiving video signals of images from the at least one camera 35 at the desired location 1 and time and position information from the GPS receiver that is receiving signals from one or more GPS satellites 40.

While storing at least video data, (and other accident related data such as audio, time, location and traffic signal status, as may be desired by the agency deploying the system 1), in a circular buffer that goes on for a predetermined period of time step 52, (said predetermined period of time, and others referenced herein, being set in accordance with the preferences of the agency deploying the system), the processor in the control unit 25 compares incoming sounds to a database of threshold acoustic signatures step 53 to determine if a qualifying sound is present in the incoming audio stream indicating a probability that an accident is occurring. In a preferred embodiment, the control unit 25 predicts traffic incidents based on both a predetermined set of acoustic criteria, as well as adaptive and possibly less stringent criteria. The control unit 25 may receive updates to its database and algorithms through the one or more available communication link(s) 50.

If at any time, the incoming audio signals are determined to be a qualifying sound, the control unit 25 stops overwriting and preserves the data stored in the circular buffer prior to the qualifying sound 54, and moves to step 55 where the control unit 25 continues to save at least the subsequent video data, and if desired some or all of other accident-related data such as audio data, traffic signal status, time and location data, (collectively referred to as the "accident-related data"), all of which continues to be saved in the buffer for a predetermined period of time, that predetermined period of time being set according to the preferences of the agency deploying the system.

Also, upon determination of a qualifying sound, the control unit 25 starts a process to initiate contact with the monitoring center 45 through the communication link 50, step 75. If contact is not established with the monitoring center 45, on the first try, the control unit 25 continues to maintain the stored data in the buffer and continues to attempt establishing contact until contact is established step 76.

Upon establishing contact with the monitoring center 45, step 76, the control unit 25 transmits at least the location data, and if desired, at least one image of the desired location 1 to the monitoring center 45 step 77, which are preferably displayed on a monitor for a live operator at the monitoring center 45 or other remote location. During this process, the control unit 25 continues saving the desired accident-related data 78 until one of the predetermined time has passed, memory capacity has been reached or a signal is received to terminate the saving step 79.

When one of the predetermined time has passed, memory capacity has been reached, or a signal received to terminate the saving step 79, the accident-related data that has been stored in the buffer in the control unit 25 can be transmitted at step 81, via wireless or hard-wired communication link 50, to a location such as the monitoring center 45 or other remote location to be saved as a permanent record. This transmission can be started automatically, or by command from the monitoring center 25, and can commence after recording has finished, as in the preferred embodiment step 81, or alternately starts while the system is still saving accident-related data in step 78. Transmission of the accident-related data step 81 continues until the control unit 25 receives verification that the accident-related data has been successfully transmitted, step 82. If the transmission step 82 is not successful on the first or subsequent tries, the control unit 25 continues transmitting 81 the accident-related data until successful transmission is verified 82.

The use of the term "transmission" is not meant to imply that the control unit 25 must physically transmit the accident-related data, but rather indicates that the accident-related data is being passed from the control unit 25 to the monitoring center 45 or other remote location over the communication link 50 by whatever means are available for copying or moving data from one location to another. In the preferred embodiment, the accident-related data can either be transmitted from the control unit 25, or uploaded from the monitoring center 45 or other remote location, so long as the end result of the data being stored in a permanent record at a remote location is achieved. Likewise, the verification of successful transmission can be done by the control unit 25, or can take place at the monitoring center 45 or other remote location, and in case of the latter a confirmation signal is sent to the control unit 25 indicating successful transmission.

When the control unit 25 receives verification 82 that the accident-related data has been successfully transmitted, the transmission is ended step 85, the buffer or memory and storage in the control unit 25 is flushed 90 and processing returns to step 51 to wait for detection of another qualifying sound. If desired, the control unit 25 is reinitialized at step 99, however, this reinitialization 99 may be optional, since in some embodiments, the control unit 25 may support multitasking and automated task initiation and termination.

Figure 4:
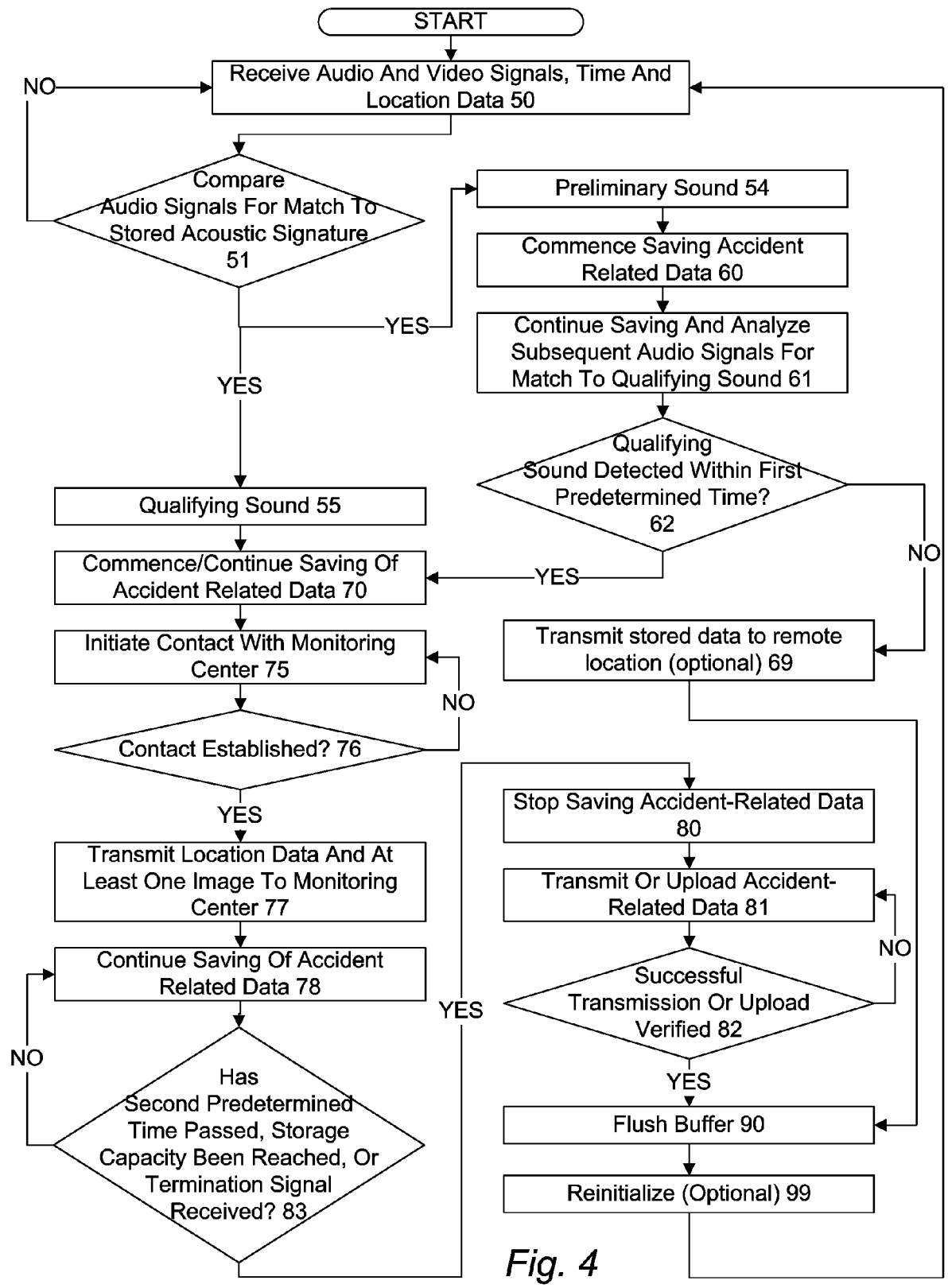
FIG. 4 is a flowchart representing the steps performed by the automobile accident detection, data recordation and reporting system according to a second embodiment of the present invention.

The following describes an alternate embodiment in which recording of audio and video data starts only upon the detection of preliminary sounds or of qualifying sounds if no preliminary sounds are detected previously. Referring now to FIG. 4, a flowchart is shown illustrating the steps performed by an alternate embodiment of the present invention. The system is activated and the control unit 25 receives audio signals from at least one microphone 15, video signals from at least one camera 35, and time and position information from a GPS receiver which is receiving signals from at least one GPS satellite 40, step 50.

The control unit 25 compares incoming sounds to a database of exemplar acoustic signatures and performs algorithms to detect traffic incident-related acoustic emissions to determine the presence of either preliminary sounds, (for example, sounds of tires screeching or skidding), indicating that an accident is about to take place, or qualifying sounds (for example, sounds of two automobiles colliding) indicating an accident is occurring, step 51. Thus, in a preferred embodiment, the control unit 25 predicts traffic incidents based on both a predetermined set of acoustic criteria, as well as adaptive and possibly less stringent criteria. The control unit 25 may receive updates to its database and algorithms through the one or more available communication link(s) 50.

If at any time, any of the incoming audio signals are determined to be a preliminary sound 54 or qualifying sound 55, the control unit 25 starts saving in a buffer at least video signals, and if desired any one or more of audio signals, time and location data, and data on the state of the traffic signals, collectively referred to as the accident-related data. This saving of accident-related data commences at step 60 if triggered by preliminary sounds step 54, or commences at step 70 if triggered by qualifying sounds step 55. If the sound that triggers the process of saving is a preliminary sound 54, the control unit 25 continues this process of saving while continuing to analyze incoming audio signals for a match to a qualifying sound 61. This process of saving continues until the earlier of the detection of a qualifying sound, or the passing of a first predetermined period of time without detection of a qualifying sound, step 62. This first predetermined period of time and other predetermined periods of time are set according to the preferences of the agency deploying the system.

On the other hand, these time periods may be adaptively determined, or context dependent. That is, the amount of time the system waits may be dependent on the type of preliminary sound detected, its intensity, or other sounds detected in temporal proximity. The system may also be weather and/or time-of-day dependent, since traffic incidents may be more likely under some circumstances than others. By carefully tuning these parameters, the sensitivity and selectivity of the system may be maintained at a high level. Since the acoustics and dynamics of each traffic intersection may differ, the criteria applied by each control unit 25 may also differ.

When the process of saving was triggered by a preliminary sound, if the first predetermined time passes without detection of a qualifying sound in step 62, this indicates that an accident has probably been avoided. If desired, at this stage in step 69, the data recorded following a preliminary sound can be transmitted to a remote location for later analysis. Otherwise, the buffer is flushed in step 90 and the system returns to step 50 to wait another preliminary or qualifying sound. If desired, the control unit 25 is reinitialized at step 99, however, this reinitialization 99 may be optional, since in some embodiments, the control unit 25 may support multitasking and automated task initiation and termination.

Whenever a qualifying sound is detected without a preceding preliminary sound, step 55, the process of saving commences immediately upon determination of the qualifying sound, step 70. When the process of saving is triggered by a preliminary sound and a qualifying sound is detected within the first predetermined period of time, the process of saving continues, step 70. After determining a qualifying sound, and commencing or continuing the process of saving 70, the process moves to step 75 where the control unit 25 initiates contact with the monitoring center 45 through the communication link 50.

If contact is not established with the monitoring center 45, the control unit 25 continues to attempt contact until contact is established, while retaining the data saved in the buffer.

Upon establishing contact with the monitoring center 45 at step 76, the control unit 25 transmits at least the location data, and if desired at least one image of the scene to the monitoring center, step 77, which are preferably displayed on a monitor for a live operator.

During the process of establishing contact with the monitoring center 45, the control unit 25 continues the process of saving the accident-related data, step 78 until the second predetermined period of time has passed, storage capacity is reached, or a signal is received to terminate the process saving, step 79.

When one of the conditions in step 79 is met, the process of saving stops, step 80, and at least a portion of the accident-related data that has been stored in the buffer in the control unit 25 is transmitted or uploaded at step 81, via wireless or hard-wired communication link 50 to a predetermined location, which can be the monitoring center 45 or another remote location, to be saved as a permanent record. This process can be started automatically, or by command from the monitoring center 45, and can commence after the process of saving has finished, or start while the system is still in the process of saving accident-related data. The process of transmitting or uploading 81 continues until verification of successful transmission or upload, step 82.

Upon verification of successful transmission or upload 82, the buffer in the control unit 25 is flushed, step 90 and the process returns to step 50 to wait for detection of another preliminary or qualifying sound. If desired, the control unit 25 is reinitialized at step 99, however, this reinitialization 99 may be optional, since in some embodiments, the control unit 25 may support multitasking and automated task initiation and termination.

Figure 5:
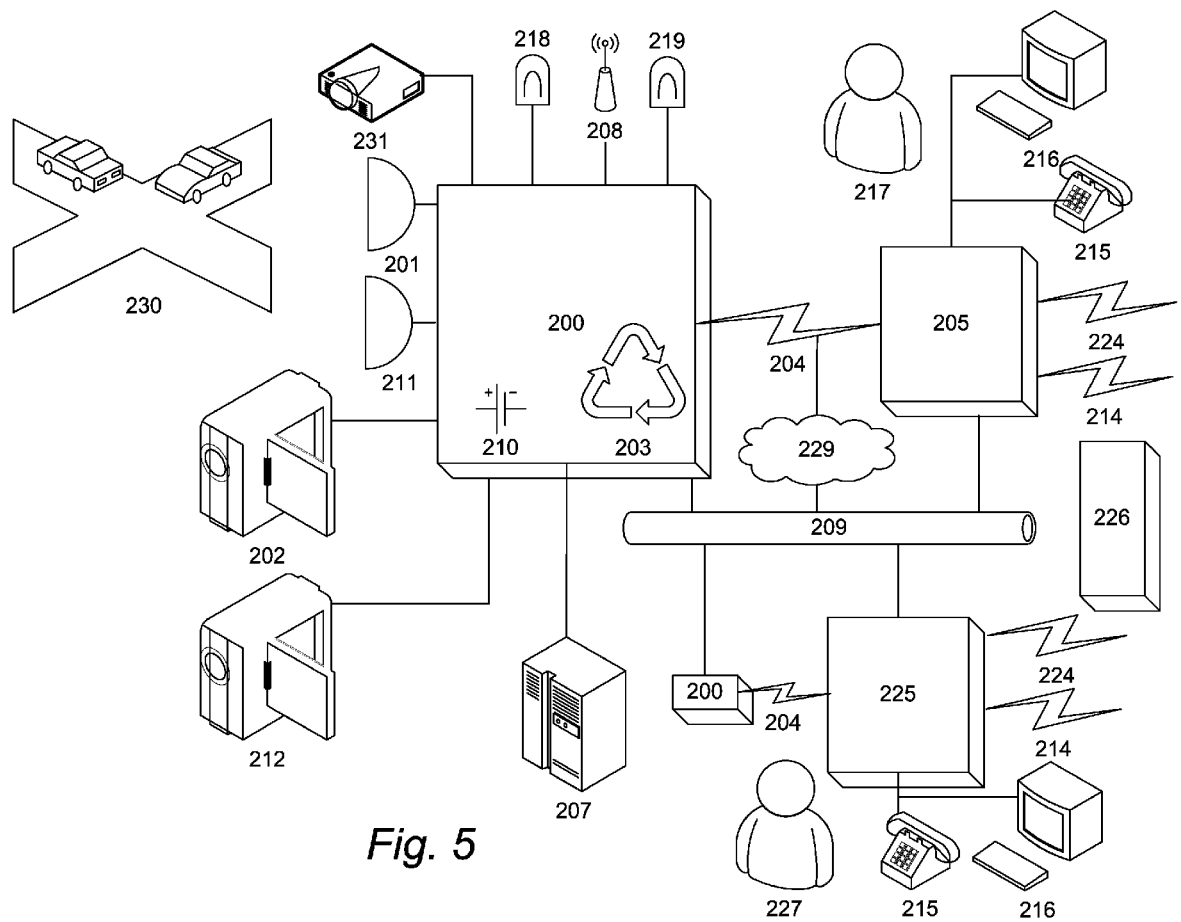
FIG. 5 is a block diagram of a system according to another embodiment the present invention.
Figure 6:
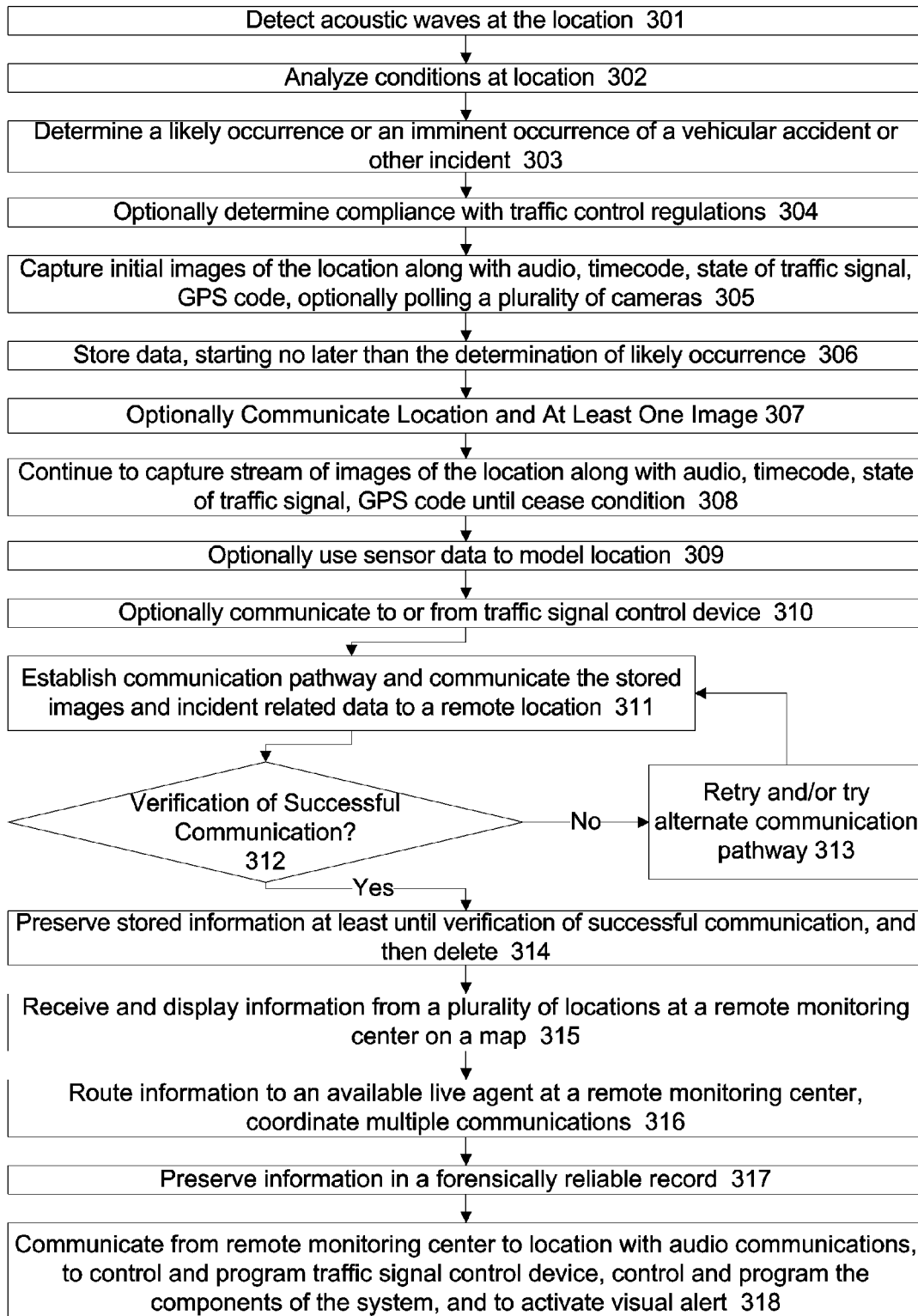
FIG. 6 is a flowchart representing steps of a method according to the embodiment of FIG. 5.

FIGS. 5 and 6 show a block diagram and flow chart or operation of a system according to the present invention. As shown in FIG. 5, a monitoring system 200, receives input from one or more acoustic inputs 201, 211, which are, for example, microphones, and one or more imaging devices 202, 212, which are, for example, photographic cameras, digital cameras, or video cameras. The microphones and cameras are disposed to receive signals from a location 230, which is a scene of a potential traffic accident or other incident. The monitoring system 200 is interfaced with a traffic signal control device 207, to transmit inputs thereto and/or receive outputs therefrom. The monitoring system 200 generally receives power from a fixed infrastructure connection, but may also include a battery backup 210. The monitoring system 200 has a geolocation system or other means by which data representing the location can be determined or maintained, for example by satellite geolocation (e.g., GPS), network location, or other method such as a location code, number or equipment identifier. Typically, a GPS system and receiver 208 are used, as this is cost efficient, requires no special programming, and is less prone to human error. At least video data, and if desired other data including audio, location, time and state of traffic signal(s), are generally stored in a memory, which has a portion organized as a circular buffer 203, which allows asynchronous reads and writes, while maintaining a generally fixed period of storage. In a circular buffer 203 configuration, new data overwrites older data after a fixed period. Where reason exists to preserve the contents of the circular buffer 203, for example when an accident or incident is detected, or data reliably associated with a prospective accident or incident is detected, the data in the buffer may be transferred to other memory, or the buffer organization altered to prevent overwriting. The monitoring system 200 may also include an enunciator, such as a light 218, to indicate to persons at the location 230 that an accident or incident has been detected and/or reported to a remote location monitoring center 205. This enunciator or light 218 may have two different states, one indicating an accident or incident has been detected, and another indicating it has been reported. If the enunciator is a light 218, a second light 219 may be added, one being used to indicate detection, the other to indicate reporting. When a light(s) 218 (and optionally 219) is used for an enunciator, it is ideally visible from a distance, acting as a signal to approaching traffic to provide a warning indicating the presence of an accident or incident at the location 230. The monitoring system 200 may include a transceiver 231, e.g., a radar or LIDAR transceiver, adapted to capture incident-related signals at the location 230.

The monitoring system 200 communicates with the monitoring center 205 through a primary communications link 204, and may also communicate through a secondary communications link 209. Either of the communications links 204, 209 may be linked to the Internet 229, although any such communications are preferably secure. The monitoring center 205 may communicate with other monitoring systems 226 through communications links 214, 224, and the monitoring system 200 may communicate with alternate monitoring centers 225. Each monitoring center 205, 225 may have one or more live operators 217, 227, which interact through terminals 216, which, for example, display maps showing the location of a monitoring system 200 producing an output, and if available at least one image from the location 230. The live agents 217, 227 can communicate with each other, emergency services, and location responders through communications systems such as telephones 215, or the communications can be directly integrated into the communications links 204, 209, especially through the Internet 229.

As shown in FIG. 6, the method according to the present invention potentially includes a number of optional and alternate steps. In order to detect an accident or incident, acoustic waves having a signature pattern corresponding to an incident type are detected 301. Conditions at the location are analyzed 302, which may include audio and/or video data, other sensor data, and may encompass high level analysis. A likely occurrence or imminent occurrence of a vehicular accident or other incident is detected 303. Optionally, a compliance with traffic control regulations of vehicles at the location is determined, for example by video analysis of vehicle movements over time 304 or the passing of a vehicle through an intersection from a direction contrary to the current state of the traffic signal at an intersection, and the video identification of a vehicle and or driver. At this stage, potentially before an accident or incident has been detected or has actually occurred, at least one image (from one or more cameras, simultaneously or polled) and other sensor data, such as sounds, traffic signal control device status, GPS location and timecode, are captured 305, and then stored 306. The location and at least one image may be initially communicated to a remote monitoring center, for example to assist in determining the nature and severity of the accident or incident 307. After capture of the initial image 305, a stream of images, along with audio, timecode, state of traffic signal, GPS (location) code information continue to be captured 308, until a cessation condition is met. Sensor data may be optionally used to model the location 309, in order to more efficiently communicate it and/or to assist in analysis. Communications with a traffic signal control device 310 may be used to determine its status, to implement a mode suited to the existence of a traffic incident, or to program the traffic signal control device. A communication pathway is established (if not preexisting), and the stored initial images, captured stream of images and other incident-related information 306 and 308 are communicated to a remote location 311. The communication process continues until verification of successful communication 312, otherwise the communication is retried and/or a new communications pathway is established 313. The stored images and information from 306 and 308 are preserved 314 until at least verification of successful communication. At the remote monitoring center, information is received and displayed on a map display, typically from a plurality of locations 315. In displaying the information, it may be routed to an available live agent, in a process which coordinates multiple communications 316. Information that has been communicated from the location in 311 is preferably preserved in a forensically reliable record, that is, it has sufficient reliability to be used as evidence in a court of law 317, although if desired the record may be preserved without forensic reliability. A forensically reliable record is not only reliable with respect to accurately representing the conditions at the location, but also preferably provides a chain of custody to ensure that it is not altered after creation. The remote monitoring center may communicate with the location, to provide audio communications, control and program the traffic signal control device, control and program components of the system, and to activate a visual alert, e.g. to indicate that an incident has been detected 318.

Figure 7:
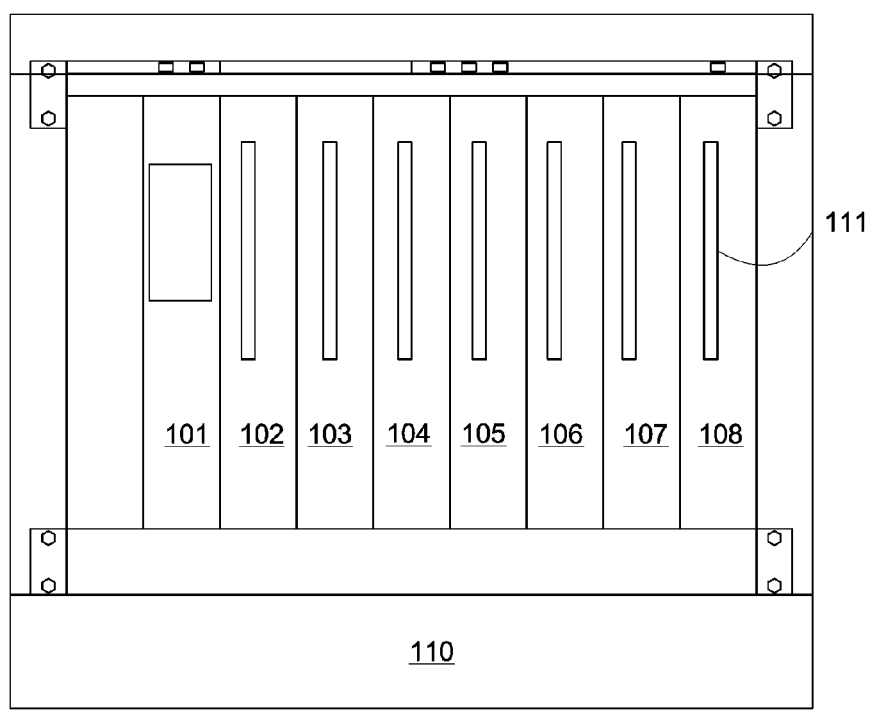
FIG. 7 shows a schematic view of an MITS, showing a single board computer main module and open slots for optional modules, as well as various communications facilities.

FIG. 7 shows a schematic view of an MITS ("MITS") Module 110, showing a single board computer main module 101 and open slots for optional modules 102, 103, 104, 105, 106, 107, 108. While the optional modules preferably interface with the main module 101 by means of a system bus 111, such as PC/104, other types of communications may be used, such as RS-232, RS-422, RS-485, CANbus, $I^2C$ bus, PXI bus, USB 2.0, IEEE-1394 (Firewire), Ethernet (any type), SCSI-II, IEEE-488 (GPIB), etc.

The components of the MITS are contained in an environmentally sealed enclosure, or the MITS may be placed inside a building adjacent to the desired location, or within another device such as a traffic signal control device that is already environmentally protected. If the MITS is outdoors and has external devices connected through one or more ports, such connections are also environmentally resistant.

Figure 10:
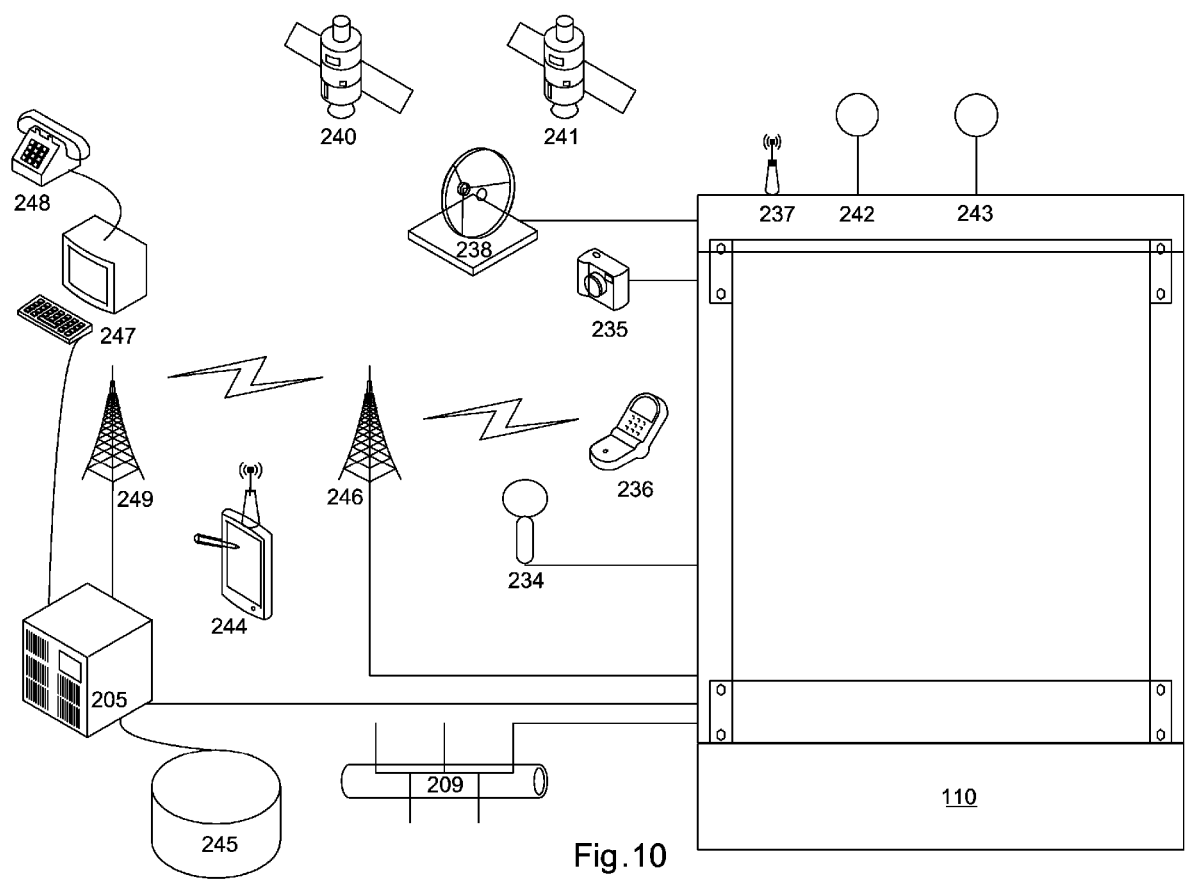
FIG. 10 shows external connectivity connections and various options for the MITS.

As shown in FIG. 10, the MITS 110 has a GPS receiver 238, communicating with at least one satellite 240, and generally with a constellation of multiple satellites 240, 241. Further, the satellites 240, 241 need not be part of the GPS system and can be part of any satellite navigation system, and communications with the satellite(s) 240, 241 may be bidirectional, and may comprise one of the possible communication links. In place of GPS, the MITS 110 may also utilize a terrestrial geolocation system, or use pre-programmed location identifier. The MITS 110 is typically installed in a fixed position, and communicates with stationary communications infrastructure, for example, one or more of a channel switched communication system, such as the "public switched telephone network" ("PSTN"), a dedicated telephone connection, or other communication means such as T-1 or fractional T-1, frame relay, DSL, Ethernet, fiber optic cable, cellular link or cellular data link, ad hoc network, mobile ad hoc network, radio or microwave link, WiFi, WiMax, or other types of communications. Preferably, at least two external communications options are available, which may be the same or different, to provide a backup link in case of failure or unavailability of the primary link. In this case, it is preferred that the primary and secondary link have different susceptibility to various impairments. The secondary link may be, for example, a more expensive communications modality, such as cellular or satellite phone system, rather than the primary link, which may be relatively inexpensive, but subject to various types of communications impairments, such as a cable modem.

The MITS 110 is connected to an audio input 234 and a video input 235. For example, the audio and video may be acquired by separate cameras 235 and microphones 234, as depicted, although advantageously, a camera and microphone may be provided in a single module, such as an environmentally protected camera-cell phone which may optionally include WiFi and GPS 236. As discussed with respect to FIGS. 11A, 11B and 11C below, this arrangement allows use of relatively inexpensive hardware which can be readily replaced, repaired or exchanged. In the embodiment shown in FIG. 11C, the processor of a cell phone 236' having GPS, cellular transceiver, WiFi and/or WiMax, camera, microphone, expansion slot, and a data port (e.g., USB 2.0 or Firewire) is programmed to execute all of the functionality of the MITS of various other embodiments hereof, and therefore dispenses with the requirement for additional hardware. This cell phone 236', for example, can be programmed using the Java language or other suitable programming and execution environment.

The MITS 110 preferably includes, separate from remote telecommunications facilities, a wireless local area network access point 237, also known as a hotspot, and may include a low power cellular base station transceiver, e.g., 3G 236. This access point 237 may be IEEE 802.11 a/b/g or R/A (DSRC) compliant, or an 802.16x (WiMax) radio, although the particular standard is less important than standards-compliance and market acceptance. The purpose of this wireless local area network access point 237 is to provide third party access to the remote communications link or local area network 209, for example Internet access, although there may also be integration with the functionality of the MITS 110 to provide assistance with vehicle navigation, routing or entertainment, accident detection and/or prevention, intelligent traffic control device operation, emergency vehicle priority, traffic information systems or other function. The local area network 209 may also be used as the primary or backup communication link for the MITS 110.

It is expressly noted that in one embodiment according to the present invention, at least one optional module is provided in the MITS 110 which is not necessarily predefined during design or manufacture, and the wireless local area network 209 may functionally integrate with this optional module as well.

While the wireless local area network access point 237 will generally service vehicles, there is no particular limitation on servicing stationary devices as well, such as nearby residences and businesses, which can generate revenues for the agency deploying the system which can come from user fees to help defray the cost of the MITS 110. On the other hand, especially for the primary communications link, the MITS 110 may make use of third-party telecommunications. That is, wireless local area network 209 access provided by one or more neighbors may be used to communicate through the Internet to the remote monitoring center 205, with the secondary communications link employed if this primary link is unavailable or if it is otherwise necessary to maintain the functionality of the MITS 110 when system resources are overburdened.

To the extent that Internet or other telecommunications access (such as telephony or voice-over internet protocol (VOIP) is provided separately from the core functionality of the MITS 110, and indeed even for core functionality, the MITS 110 may account for usage and charge user accounts, to provide access control, cost recovery, and potentially profit. This cost recovery or profit motivation may accelerate adoption by municipalities and other agencies, which will then promote usage, and ultimately, value, since units of a widely deployed system have more value than sparsely deployed units. The usage accounting may be performed by a sponsoring municipality or agency, or by an independent service. In some instances, it may even be desirable to provide Internet access at no cost, as a public service to residents, and as an incentive for business to locate in the desired coverage area.

A widely dispersed network of access points 237 may implement a mobile telecommunications protocol, such as IETF RFC 3344 (Mobile IP, IPv4), or various mobile ad hoc network (MANET) protocols, 2.5G or 3G cellular, or other types of protocols. Preferably, the protocol allows the client to maintain a remote connection while traversing between various access points 237. See, U.S. Pub. App. No. 20040073642, expressly incorporated herein by reference. Mobile Internet Protocol (Mobile IP or MIP, in this case, v4) is an Internet Engineering Task Force (IETF) network layer protocol, specified in RFC-3344. It is designed to allow seamless connectivity session maintenance under TCP (Transmission Control Protocol) or other connection-oriented transport protocols when a mobile node moves from one IP subnet to another. MIPv4 uses two network infrastructure entities, a Home Agent (HA) and an optional Foreign Agent (FA), to deliver packets to the mobile node when it has left its home network. MIPv4 also supports point-of-attachment Care-of Addresses (CoA) if a FA is unavailable. Mobile IP is increasingly being deployed for 2.5/3 G (2.5 or third generation wireless) provider networks and may be deployed in medium and large Enterprise IEEE 802.11-based LANs (Local Area Networks) with multiple subnets. MIPv4 relies on the use of permanently assigned "home" IP addresses to help maintain connectivity when a mobile device connects to a foreign network. On the other hand, IPsec-based (Internet Protocol Security, a security protocol from IETF) VPNs (Virtual Private Networks) use a tunneling scheme in which the outer source IP address is based on a CoA at the point-of-attachment and an inner source IP address assigned for the "home" domain. In general, if either address is changed, such as when the mobile node switches IP subnets, then a new tunnel is negotiated with new keys and several round-trip message exchanges. The renegotiation of the tunnel interferes with seamless mobility across wired and wireless IP networks spanning multiple IP subnets.

The MITS 110 may also include other sensors 242, such as weather (e.g., rain, fog, sleet, snow, temperature, humidity, etc.).

The MITS 110 preferably provides a communications link for public safety and emergency vehicles. For example, a police officer can use a personal digital assistant-type device 244 with wireless local area network capability to control a traffic control device at an intersection. While this communications link may comprise the generic communications link and/or wireless local area network access point 237 heretofore described, the MITS 110 may also communicate using licensed public safety spectrum or otherwise integrate with communications systems provided in public safety or emergency vehicles, without necessarily using the normal wireless network. For example, if the normal wireless network typically operates near capacity, or the network operates using unlicensed spectrum, the quality of service for emergency use may be insufficient. Access security may be controlled by username/password, virtual private network or encrypted communications, remote or biometric authentication, or other known security techniques.

As discussed above, the MITS 110 may be remotely controlled, and thus, for example, an external signal may be used, through the MITS 110, to control the state of a traffic signal through the traffic signal control device, to control microphones 234, cameras 235 and data storage, and telecommunications functions, to control an optional module using a standard application programming interface (API), or the like. In the case of accident detection or prevention functions, it is also possible for the MITS 110 to coordinate functions of vehicles approaching an intersection. That is, in order to prevent an accident, or in various other circumstances, it may be appropriate for the MITS 110 to communicate with nearby vehicles to control their behavior, either directly through an automated control system in the vehicle, or indirectly, by providing individual instructions to a driver. Thus, for example, an intersection might be normally marked "No Turn On Red", but the MITS 110 may provide permission to a compatible vehicle to nevertheless proceed. By providing vehicle-by-vehicle permission, a finer-grained control may be executed. For example, a small car, with a narrow turning radius, might be permitted to turn right, while a truck might not, depending on traffic circumstances. Likewise, if a vehicle is approaching black ice near an intersection, the MITS 110 may communicate with nearby vehicles and control the intersection to avoid the need for a change in speed by the vehicle. Using its cameras 235, the MITS 110 may have a unique perspective regarding the relationship of vehicles, and may therefore execute emergency measures on their behalf to avoid collision or other types of incident.

Intelligent transportation systems typically gather and have updated and precise traffic information available to them, and the MITS 110 may utilize and distribute this information. This information itself may be valuable to third parties. For example, U.S. Pat. Nos. 6,252,544 and 6,429,812, expressly incorporated herein by reference in their entirety, disclose, for example, a system in which in-vehicle navigation systems make use of remotely transmitted real time traffic information to guide a car to avoid traffic. Likewise, Navteq and XM Radio have developed a service called NavTraffic for providing traffic information by satellite radio to an in-vehicle navigation system. In each of these cases, the data available from the MITS 110 may be provided to these systems, for relay to the vehicles. Likewise, information from vehicles, such as video data, on-board diagnostic information, or various vehicle data, may be communicated to the MITS 110 for its own use as well as for dissemination for use by others.

In order to encourage usage of aspects of the system, it may be desirable to protect the privacy of vehicles and their drivers, and a number of means are available for this purpose. For example, unless certain conditions are met, the MITS 110 may censor communications to block transmission of license plate data, while this data may be retained internally or encrypted for transmission externally. Likewise, certain sensitive information, such as vehicle speed (where no incident has occurred), may be intentionally corrupted in such a manner that it is statistically accurate but not forensically reliable, thus avoiding issues as whether interaction with the MITS 110 would result in potential liability for traffic infractions. The basis for the corruption may also be stored locally or encrypted and communicated externally, in case it is later determined that there has been an incident, or for other legitimate reasons.

The MITS 110 may also include radio frequency identification (RF-ID) technologies 243 for identifying people, vehicles or other objects. The MITS 110 may also be used to assist in parking management. For example, the location of vacant parking spots (detected by special sensors or by video cameras) may be broadcast to vehicles looking for parking. Parking regulations may also be enforced by similar means. The MITS 110 may also be used to account for parking usage, alleviating the need for meters and coin or bill feeds, for example expanding electronic toll collection or similar technologies for payment of parking fees.

The MITS 110 can further assist in public safety, for example warning motorists of potential hazards, such as children playing nearby or bicyclists, and possibly regulating traffic speed based on local conditions. By monitoring activities with video, various criminal activities can be recorded, and the criminal(s) identified. For example, the system may be used to capture evidence of abduction or other criminal activities.

Figure 8:
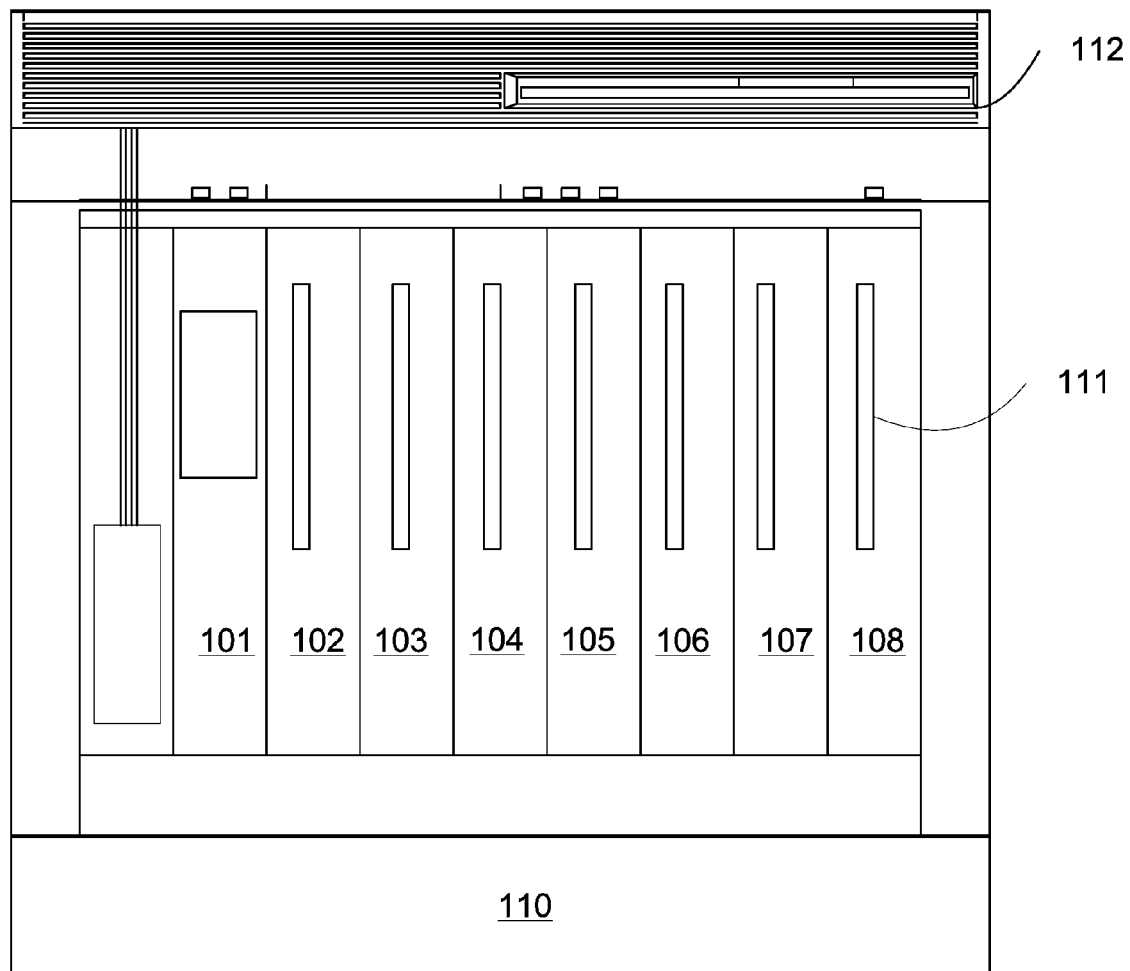
FIG. 8 shows a schematic view of an MITS, showing an adjacent accessory component.
Figure 9:
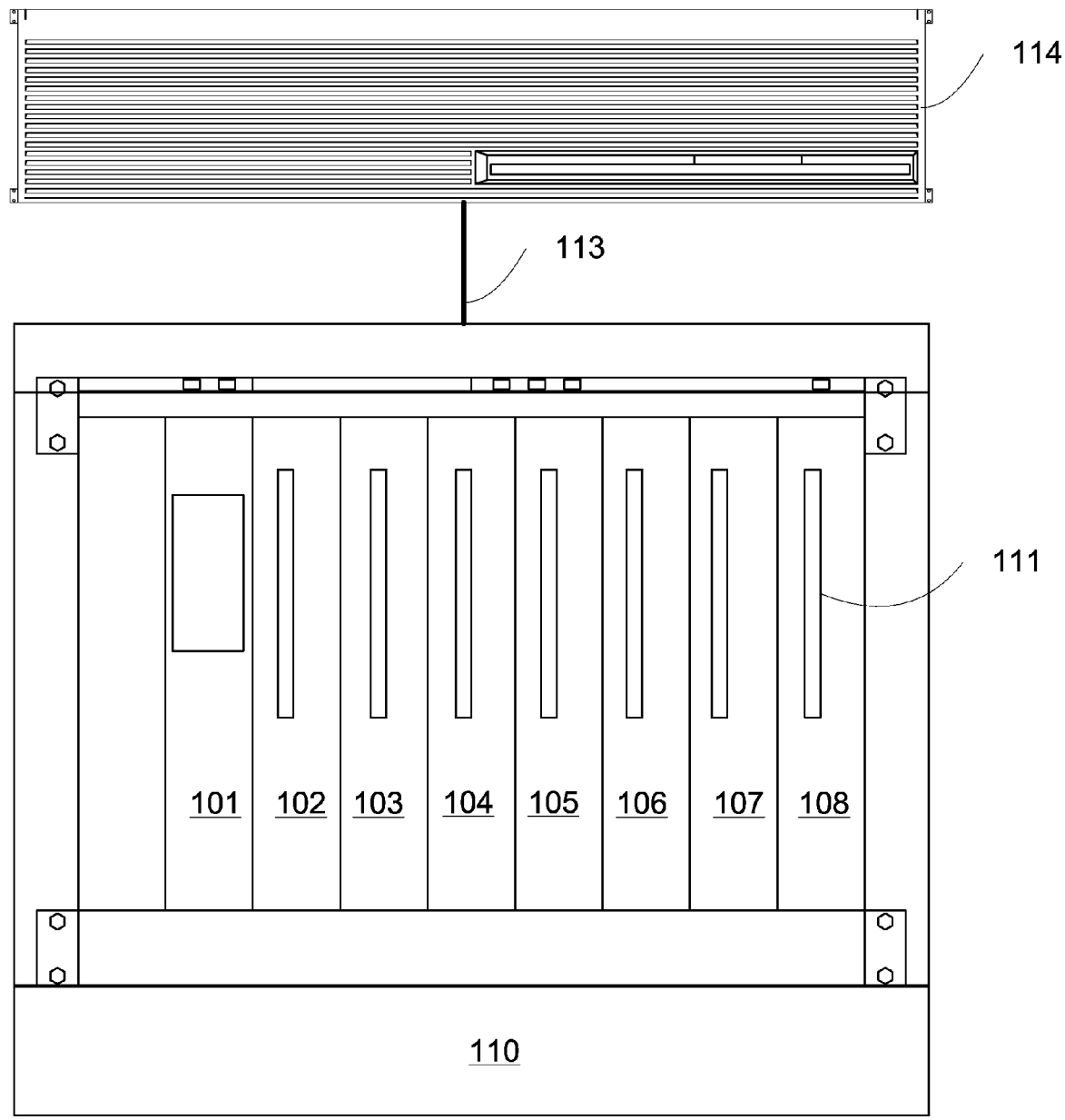
FIG. 9 shows a schematic view of an MITS, showing an interconnected accessory component.

As shown in FIG. 8, the optional module 112 need not be a bus-based device, and may be located within the enclosure by as a separate subsystem. Likewise, as shown in FIG. 9, the optional module 114 may communicate with the main module 101 by means of a data communications connection 113, which may be, for example, a thin Ethernet connection, Firewire, USB, serial interface such as RS-422, parallel interface, such as IEEE-488, wireless communications such as IEEE-802.11g, Bluetooth, DSRC, and fiber optic cable. The MITS 110 may support multiple modules of this type, and may utilize the data communications connection 113 to connect the microphones, cameras, access points and other external devices.

FIG. 10 shows various connections and connectivity options for the MITS 110 according to the present invention. The MITS 110 preferably includes an IEEE-802.11x, preferably multi-standard (a/b/g/R/A (DSRC)), hotspot access point 237, which supports MobileIP and can communicate with wireless enabled devices 244 such as a pocket PC, tablet PC, network enabled cellular phones, or notebook computers equipped with wireless Ethernet. This access point 237 may also support MANET network architectures, and provide both public and private access. The MITS 110 may be connected to an Ethernet network 209 T1, DSL or Cable Modem for broadband connectivity. The MITS 110 is preferably linked by any of various means to a central monitoring station 205, which typically comprises a call center, having agent terminals 247 and agent voice communication telephones 248, as part of a vehicular incident management or telematics system which also incorporates remote data storage 245 for storing information communicated from the MITS 110. The MITS 110 preferably includes a GPS receiver 238, which receives geolocation signals from a set of satellites 240, 241, although other types of geolocation systems, and in particular terrestrial geolocation systems including the E911 system, or a location identifier data may also be employed. The MITS 110 may be linked to a cellular 236 or other type of radio transceiver 237, which permits wireless communications with a cellular system 246 or other wireless network 249. The MITS 110 preferably has a camera 235 for receiving image data, for example imaging vehicular incidents or other objects. The camera 235 may have a microphone or separate microphones may be provided for acoustic signal input 234. The MITS 110 may also wirelessly communicate with WiFi/camera/cellular phones 236 (or the components of cellular phones incorporated within the MITS 110), either wirelessly through the cellular 246 or other wireless system 249 antennas, the hotspot access point 237, or by a wired data connection through the phones data port. The MITS 110 may utilize cellular phones 236 that are WiFi and/or GPS enabled. The MITS 110 may also be connected to or incorporate other types of sensors 242, and receivers for RFID transponders 243.

Figure 11A:
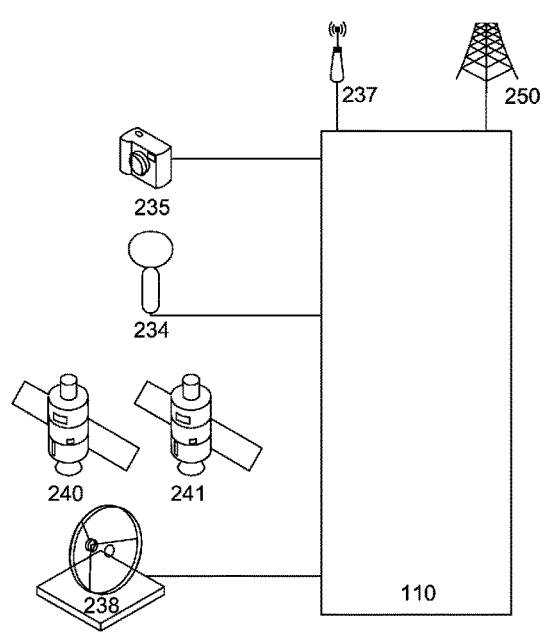
FIGS. 11A and 11B show aspects of an alternate embodiment of the invention employing a video-enabled cellular telephone handset at a remote location, showing the camera and microphone connected to a MITS, and the MITS and associated sensors at an intersection, respectively.
Figure 11B:
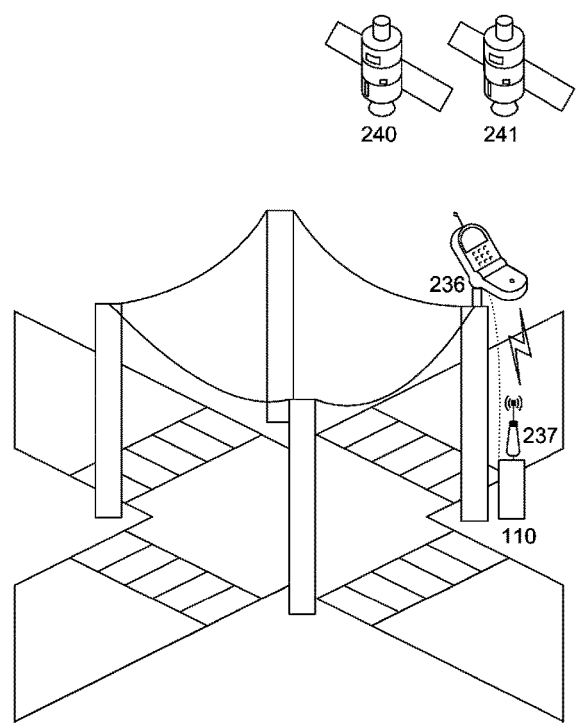

FIGS. 11A and 11B show aspects of another alternate embodiment of the MITS 110 intended to use off-the-shelf components for accident detection intended to be a lower cost alternative to the preferred embodiment. One alternate solves this problem and minimizes the cost of deployment and operation of the system by utilizing a cellular phone and the wireless E-911 system.

As shown in FIG. 11A, this alternate embodiment also uses at least one microphone 234 connected to the MITS 110, at least one of a still or video camera 235, and a cellular transceiver 250. Preferably, the microphone 234, camera 235 and cellular transceiver 250 can be combined into one unit, as shown in FIG. 11B, as in the video-enabled cellular phones that are becoming widely available in the consumer market. Preferably, this video enabled cellular phone 236 also incorporates WiFi 237 and a GPS receiver 238. For this application, preferably, the video cellular phone unit 236 is weather-proof itself, or is enclosed in a weather proof enclosure that enables it to detect sounds and capture video of the desired location, and it is connected to the MITS 110 either wirelessly or by a wired data connection through the data port on the cellular phone 236. While it is preferable to have all the components together in one unit as shown in FIG. 11B, a variation of this alternate embodiment shown in FIG. 11A can use the components of a video cellular phone 236 or similar components, placing the components, 234, 235, and 250, in various places about the desired location and connecting them together either through the MITS 110 or through the cellular transceiver 250 or WiFi 237 component. The cellular telephone 236 (or the components of a cellular telephone 234, 235 and 250 as the case may be) is preprogrammed so that upon receiving a signal from the MITS 110, it places a "911" call and delivers a pre-recorded message indicating a vehicular incident may have occurred at the location. In some embodiments, this programming may be in the MITS 110, and the MITS 110 may execute the 911 call through the cellular transceiver 250 and deliver the pre-recorded message once connected. The cellular transceiver 250 may also transmit an SMS or other data message in the event that the emergency response center is data-call enabled.

In this alternate embodiment, the MITS 110 monitors the location comparing incoming audio signals for a match to at least one of preliminary and qualifying sounds as in the preferred and other alternate embodiments of the accident detection system. When the processor determines that an accident is about to or has occurred (detection of a sound matching at least one of a preliminary or qualifying sound), a signal is sent to the cellular telephone 236 to dial 911 (or the MITS 110 unit connected to the cellular phone 236 dials 911).

The E-911 operator will receive the pre-recorded message indicating an accident has happened at this location, and the E-911 system will provide the location. Preferably, at least one video image is available to the E-911 operator, although this is not required in this alternate embodiment. As in other embodiments, the images and other accident-related data can be temporarily stored in memory in the MITS 110, or can be sent directly by the cellular telephone 236 to the desired remote location for permanent storage.

In one variation of this alternate embodiment, if the images are stored in a memory buffer in the MITS 110, then images for a predetermined period preceding and following the detection of an accident, together with other desired incident information, can be automatically transmitted to a remote location where a permanent record of the event is created.

This alternate embodiment uses standardized components which can be readily replace repaired or exchanged, and employs the existing infrastructure and resources of the E-911 system to report and determine the location of an accident and dispatch emergency response personnel, thereby reducing the cost of operation and administration of the accident detection system by eliminating the need for a separate remote monitoring center staffed with manned by live operators. The incident record can be retrieved from the remote location at a later time based on the time and location or other criteria to identify the record of an incident. It is also possible in this alternate embodiment to use video images to determine the state of the traffic light, thereby further reducing the cost of the accident detection system and its deployment. While a separate communication link is desirable, in some variations of this alternate embodiment, it may be desirable to use the cellular phone 236 itself to transmit the accident-related data to a remote location, in which case, the remote location is contacted by the cellular phone 236 after completion of the 911 call, and the images and other desired accident-related data are transmitted to the remote location after contact is established. A wireless modem with cellular phone capabilities may also be employed, where the 911 call is placed as a cellular call and the data functionality is used to transmit the images and other desired accident-related data.

Figure 11C:
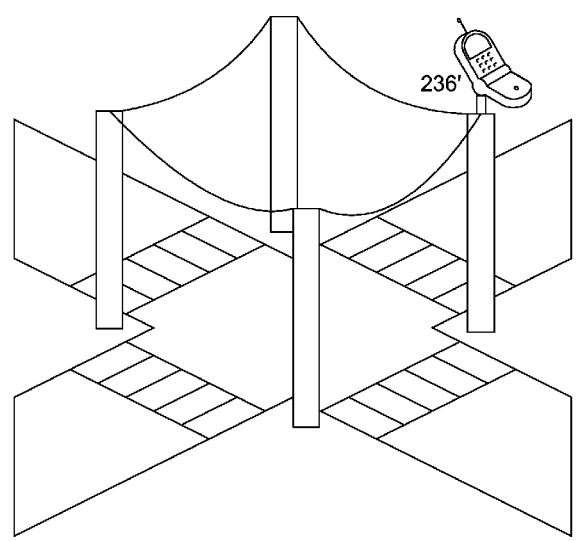
FIG. 11C shows an embodiment of the invention which employs a cell phone having GPS, a cellular transceiver, a WiFi and/or WiMax radio, a camera, a microphone, an expansion slot, and a data port.

In another variation of this embodiment, when the MITS 110 detects a vehicular incident, the cellular transceiver 250 is preprogrammed or used by the MITS 110 to call 911 and deliver a pre-recorded message, without sending or saving any additional information. This embodiment supports deployment of a lower cost yet reliable accident detection and reporting system with a single purpose of detecting and reporting accidents to the E-911 system. In a variation of this alternate embodiment as shown in FIG. 11C, the cellular transceiver 236' assumes the function of the MITS (and can be treated as a MITS), and the audio, video, processor, memory, WiFi and other desired modules are incorporated into a single housing. Another variation of this alternate embodiment can utilize a regular telephone and telephone line and the public switch telephone network (PSTN) to achieve the same purpose.

It is understood that the present invention is not technologically limited by available cellular telephone hardware (or other hardware) or emergency response center implementations, and that available resources may be employed in accordance with the teachings of the present invention. For example, a WiFi or WiMax enabled video-conference cell phone may implement some or all of the functions described with respect to the preferred embodiment, albeit in a smaller form factor with potentially greater environmental vulnerability.

The instant invention has been shown and described herein in what is considered to be the most practical and preferred embodiment and alternate embodiment. It is recognized, however, that the preferred and alternate embodiment are not intended to be limiting, and that departures may be made therefrom within the scope of the invention and that obvious modifications will occur to a person skilled in the art.

What is claimed is:

1. A monitoring system, comprising:
   at least one video camera configured to produce an image stream;
   at least one buffer memory, configured to receive data representing the image stream, selectively preserve a first segment of the data representing a first portion of the image stream and selectively overwrite a second segment of the data representing a second portion of the image stream;
   a wireless communication network link to a communication network; and
   at least one automated processor configured to:
      detect an event based on at least one of an image, a sound and an acceleration;
      mark as the first segment, a portion of the data representing the image stream for a period of time preceding and concurrent with detection of the event;
      mark as the second segment a portion of the data representing the image stream which is not succeeded by detection of the event within the period of time; and
      control the wireless communication network link to communicate at least the marked first segment over the communication network.

2. The monitoring system according to claim 1, wherein the at least one automated processor is housed within a motor vehicle.

3. The monitoring system according to claim 1, further comprising a global positioning system receiver configured to produce information defining a global location, wherein the at least one automated processor configured to provide a navigational interface selectively dependent on the information defining the global location.

4. The monitoring system according to claim 1, wherein the wireless communication network link is configured to communicate over the communication network with a remote monitoring center.

5. The monitoring system according to claim 1, wherein the wireless communication network link is a cellular radio transceiver.

6. The monitoring system according to claim 1, further comprising a global positioning system receiver configured to determine a global location of the global positioning system receiver, and the at least one automated processor is further configured to communicate the determined global location of the global positioning system receiver upon occurrence of the detected event over the wireless communication network link.

7. The monitoring system according to claim 1, wherein the monitoring system is carried by a first vehicle, further comprising a global positioning system receiver configured to determine a global location of the global positioning system receiver, and the at least one automated processor is further configured to transmit information relating to the event and the global location to a second vehicle in real time.

8. The monitoring system according to claim 1, wherein at least a portion of the image stream is stored in a memory in cryptographically authenticated digitally compressed form.

9. The monitoring system according to claim 1, wherein the at least one automated processor is further configured to detect the event based on a temporal correlation of at least two types of data comprising the image, the sound and the acceleration.

10. The monitoring system according to claim 1, wherein the at least one automated processor is further configured to extract a motion vector of an object from the image stream, and detect the event based on an analysis of the motion vector.

11. The monitoring system according to claim 1, wherein the at least one automated processor is further configured to process an output of a microphone, and detect the event based on a correspondence of the output of the microphone with an event acoustic signature.

12. The monitoring system according to claim 11, wherein the event acoustic signature comprises an accident acoustic signature.

13. The monitoring system according to claim 11, wherein the at least one automated processor is further configured to determine whether a vehicle complies with a rule associated with at least one of a state of a traffic signal, a traffic sign, and a traffic rule.

14. A monitoring method, comprising:
receiving an image stream from a video camera;
selectively preserving a first segment of the data representing the image stream in a memory buffer;
selectively overwriting a second segment of the data representing the image stream in the memory buffer;
detecting an event based on at least one of an image, a sound, and an acceleration;
marking a first portion of the data representing the image stream for a period of time preceding and concurrent with detection of the event as the first segment;
marking a second portion of the data representing the image stream for the period of time which is not succeeded by detection of the event as the second segment; and
controlling, with an automated processor, a wireless communication network link to communicate at least the marked first portion of the data through a communication network.

15. The monitoring method according to claim 14, wherein the wireless communication network link comprises a cellular radio transceiver which communicates over the communication network with a remote monitoring center.

16. The monitoring method according to claim 14, wherein the automated processor is carried by a vehicle, the vehicle further comprising a global positioning system which produces a global location of the vehicle, and a navigational interface selectively dependent on the global location.

17. The monitoring method according to claim 16, further comprising:
determining whether a vehicle complies with at least one rule associated with at least one of state of a traffic signal, a traffic sign, and a traffic rule; and
communicating the global position of the vehicle and at least one of a status of the detection of the event and the determination of vehicle compliance with the at least one rule to a second vehicle in real time.

18. The monitoring method according to claim 14, wherein the event is detected based on a temporal correlation of at least two types of data selected from the group consisting of the image, the sound and the acceleration.

19. The monitoring method according to claim 14, further comprising extracting least one of a motion vector of an object from the image stream, and an acoustic signal from a microphone, and detecting the event based on at least one of an analysis of the motion vector and a correspondence of the acoustic signal with an event acoustic signature.

20. A monitoring system, comprising:
an environmentally protected enclosure, suitable for protecting electronic equipment from an external environment;
a bus, providing a communications interface between devices connected to the bus within the environmentally protected enclosure;
a wireless communication network link configured to communicate with a remote communication network and to communicate with the bus;
a port configured to receive a signal indicating an external state, selected from the group consisting of an audio signal, a video signal, and an acceleration signal;
at least one buffer memory, configured to receive data representing the signal, selectively preserve a first segment of the received data, and selectively overwrite a second segment of the received data;
at least one automated processor, configured to:
communicate with said bus;
receive data from the port;
analyze data patterns represented in the signal and determine occurrence of an event;
mark as the first segment a portion of the data preceding occurrence of the event over a period of time;

mark as the second segment a portion of the data which is not succeeded by occurrence of the event over the period of time; and control the wireless communication network link through the bus to communicate at least the first segment over the communication network; and a power supply, configured to provide power to at least the automated processor module, the bus, the wireless communication network link, and the at least one buffer memory.

* * * * *